United States Patent
Elvanoglu

(10) Patent No.: US 12,332,060 B2
(45) Date of Patent: *Jun. 17, 2025

(54) LOCALIZING TRANSPORTATION REQUESTS UTILIZING AN IMAGE BASED TRANSPORTATION REQUEST INTERFACE

(71) Applicant: Lyft, Inc., San Francisco, CA (US)

(72) Inventor: Ferhan Elvanoglu, San Jose, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,107

(22) Filed: Jan. 26, 2024

(65) Prior Publication Data
US 2024/0167826 A1 May 23, 2024

Related U.S. Application Data

(63) Continuation of application No. 18/170,273, filed on Feb. 16, 2023, now Pat. No. 11,906,312, which is a
(Continued)

(51) Int. Cl.
*G01C 21/32* (2006.01)
*G01C 21/36* (2006.01)
(Continued)

(52) U.S. Cl.
CPC ......... *G01C 21/32* (2013.01); *G01C 21/3602* (2013.01); *G01C 21/3638* (2013.01);
(Continued)

(58) Field of Classification Search
CPC .......................... G01C 21/32; G01C 21/3602; G01C 21/3638; G01C 21/3647; G06T 7/70;
(Continued)

(56) References Cited

U.S. PATENT DOCUMENTS

| 6,895,126 B2 * | 5/2005 | Di Bernardo | G01C 11/02 |
| | | | 382/284 |
| 7,369,161 B2 * | 5/2008 | Easwar | H04N 1/46 |
| | | | 348/222.1 |

(Continued)

OTHER PUBLICATIONS

U.S. Appl. No. 16/411,653, Mail Date Oct. 14, 2021, Notice of Allowance.
(Continued)

*Primary Examiner* — Gertrude Arthur Jeanglaude
(74) *Attorney, Agent, or Firm* — Keller Preece PLLC

(57) ABSTRACT

The present application discloses an improved transportation matching system, and corresponding methods and computer-readable media. According to the disclosed embodiments, the transportation matching system utilizes an image-based transportation request interface and environmental digital image stream to efficiently generate transportation requests with accurate pickup locations. For instance, the disclosed system can utilize one or more environmental digital images provided from a requestor computing device (e.g., a mobile device or an augmented reality wearable device) to determine information such as the location of the requestor computing device and a transportation pickup location within the environmental digital images. Furthermore, the disclosed system can provide, for display on the requestor computing device, one or more augmented reality elements at the transportation pickup location within an environmental scene that includes the transportation pickup location.

20 Claims, 15 Drawing Sheets

Related U.S. Application Data continuation of application No. 16/411,653, filed on May 14, 2019, now Pat. No. 11,604,069.

(51) Int. Cl.
   *G06Q 10/02*  (2012.01)
   *G06Q 50/40*  (2024.01)
   *G06T 7/70*   (2017.01)
   *G08G 1/00*   (2006.01)

(52) U.S. Cl.
   CPC ......... *G01C 21/3647* (2013.01); *G06Q 10/02* (2013.01); *G06Q 50/40* (2024.01); *G06T 7/70* (2017.01); *G08G 1/202* (2013.01); *G06T 2207/30244* (2013.01)

(58) Field of Classification Search
   CPC .......... G06T 2207/30244; G06Q 50/40; G06Q 10/02; G08G 1/202
   See application file for complete search history.

(56) References Cited

U.S. PATENT DOCUMENTS

| | | | |
|---|---|---|---|
| 7,389,181 B2 * | 6/2008 | Meadow | G06F 16/78 701/523 |
| 8,060,525 B2 | 11/2011 | Svendsen et al. | |
| 10,093,252 B2 | 10/2018 | Zych | |
| 10,347,046 B2 | 7/2019 | Mullins | |
| 10,621,452 B2 | 4/2020 | Efland | |
| 10,636,108 B2 | 4/2020 | Eyler et al. | |
| 10,837,788 B1 | 11/2020 | Kentley-Klay et al. | |
| 11,010,693 B2 | 5/2021 | Sarawgi et al. | |
| 11,604,069 B2 * | 3/2023 | Elvanoglu | G06Q 10/02 |
| 2003/0210806 A1 | 11/2003 | Shintani et al. | |
| 2013/0054359 A1 | 2/2013 | Ross et al. | |
| 2015/0172894 A1 | 6/2015 | Gabel | |
| 2017/0255880 A1 | 9/2017 | Daher et al. | |
| 2017/0343375 A1 | 11/2017 | Kamhi et al. | |
| 2018/0067620 A1 | 3/2018 | Adler | |
| 2018/0075287 A1 | 3/2018 | Elswick | |

OTHER PUBLICATIONS

U.S. Appl. No. 16/411,653, Mail Date Aug. 8, 202, Office Action.
U.S. Appl. No. 16/411,653, Mail Date Nov. 17, 202, Notice of Allowance.
U.S. Appl. No. 18/170,273, Mail Date Jul. 19, 2023, Office Action.
U.S. Appl. No. 18/170,273, Mail Date Oct. 17, 2023, Notice of Allowance.

* cited by examiner

LOCALIZING TRANSPORTATION REQUESTS UTILIZING AN IMAGE BASED TRANSPORTATION REQUEST INTERFACE

CROSS-REFERENCE TO RELATED APPLICATIONS

The present application is a continuation of U.S. application Ser. No. 18/170,273, filed on Feb. 16, 2023, which is a continuation of U.S. application Ser. No. 16/411,653, filed on May 14, 2019, now U.S. Pat. No. 11,604,069, issued Mar. 14, 2023. The aforementioned applications are hereby incorporated by reference in their entirety.

BACKGROUND

The utilization of mobile app-based transportation systems has grown significantly in recent years. Through such transportation systems, a requestor computing device can generate and send a transportation request to a remote server across a computer network. The system can then match the transportation request to a provider computing device associated with a transportation provider, transmitting a pickup location and destination location to the provider computing device. In this manner, transportation systems can utilize computer networks to align requestor computing devices and transportation computing devices in providing transportation services.

Although conventional systems are able to utilize computer networks to connect requestor and provider computing devices, they suffer from a number of disadvantages, particularly in relation to accuracy and efficiency of implementing computing systems. For instance, the use of mobile applications often results in inaccuracies in identifying and transmitting pickup locations for requestor devices. To illustrate, some conventional systems have requestors provide user input of a pickup location at a requestor device (e.g., via a digital map). This approach often results in inaccurate pickup locations, as requestors cannot accurately identify their surrounding environment while initiating a transportation request (e.g., cannot accurately identify the surrounding environment on a digital map due to limited visibility, due to unfamiliar and/or foreign surroundings during travel, or due to unfamiliarity with traffic laws related to transportation requests).

Some transportation systems seek to remedy this deficiency by utilizing GPS to identify a requestor and pickup location. However, in many instances, conventional systems that utilize GPS on a requestor computing device fail to accurately locate the requestor computing device. For example, urban areas often include urban canyons where line-of-site to satellite systems is interrupted, making GPS signals unreliable and inaccurate. Additionally, some conventional transportation systems may use GPS to locate the general location of the requestor computing device, but fail to determine an accurate pickup location with the precision needed for a provider computing device (e.g., determining that the requestor is on the opposite side of the street from where the pickup location is set).

Even where conventional systems identify an accurate pickup location, conventional systems often provide that position within a user interface that makes it difficult, time-consuming, and inefficient to accurately and safely navigate to the pickup location. For example, conventional systems often provide a pickup location on a user interface that includes a top-down map. For requestors that are unfamiliar with a particular region, this user interface can require excessive time and user interaction to identify the location of the pickup location in the real-world environment. Indeed, conventional systems often require excessive time and user interactions as requestors zoom, pan, or physically rotate the computing device in an effort to translate the pickup location portrayed in the user interface to the real-world environment.

In addition to these problems, conventional systems also suffer from operational inefficiencies. Indeed, conventional systems often waste time and computational resources in identifying a pickup location for a requestor device. For example, as discussed above, conventional systems engage in numerous communications in identifying pickup location, such as communications with GPS systems or transmitting locations selected via a digital map. In addition to the computational resources required to manage these processes, conventional systems also carry the overhead of additional duplicative communications between requestor devices and transportation devices when a pickup location is inaccurate. To illustrate, upon identifying and transmitting inaccurate pickup locations, conventional systems must facilitate and transmit multiple additional communications between requestor devices and provider devices over time (e.g., when the requestor and/or transportation provider cannot locate each other and/or the determined pickup location). Accordingly, identifying an accurate pickup location is among the most time consuming and computationally expensive processes of conventional transportation systems.

Thus, there are several disadvantages with regard to conventional digital transportation systems.

SUMMARY

One or more embodiments of the present disclosure provide benefits and/or solve one or more of the foregoing or other problems in the art with methods, systems, and non-transitory computer readable storage media that utilize an image-based transportation request interface and environmental digital image stream to efficiently establish transportation requests between requestor and provider computing devices with accurate pickup locations. For example, the disclosed systems can generate a ride-sharing experience across computer networks without the inaccuracies and inefficiencies of conventional approaches that use digital maps (e.g., GPS map locations or user-generated position selections). Specifically, the disclosed systems can compare an environmental digital image stream from a requestor computing device with known digital images of known geographic locations to identify a position of the requestor device. The disclosed systems can then select and provide a pickup location within the environmental scene. For example, the disclosed systems can generate an augmented reality element and provide the augmented reality element in the environmental digital image stream of the requestor device. In this manner, the disclosed systems can accurately and efficiently identify requestor device locations and communicate corresponding pickup locations to requestor and/or provider computing devices.

To illustrate, in one or more embodiments, the disclosed systems cause a requestor computing device to capture an environmental digital image stream utilizing a camera of the requestor computing device (e.g., when a requestor begins a transportation request on the requestor computing device). Furthermore, in some embodiments, the disclosed systems determine a location of the camera based on the captured environmental digital image stream. Moreover, in one or more embodiments, the disclosed systems determine at least one transportation pickup location based at least in part on the location of the camera. Then, the disclosed systems can utilize the at least one transportation pickup location (and/or other information related to the transportation request) to provide, for display on the requestor computing device, an augmented reality element at the at least one transportation pickup location within an environmental scene (e.g., on a display screen of a mobile device and/or on a lens of an augmented reality wearable device).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
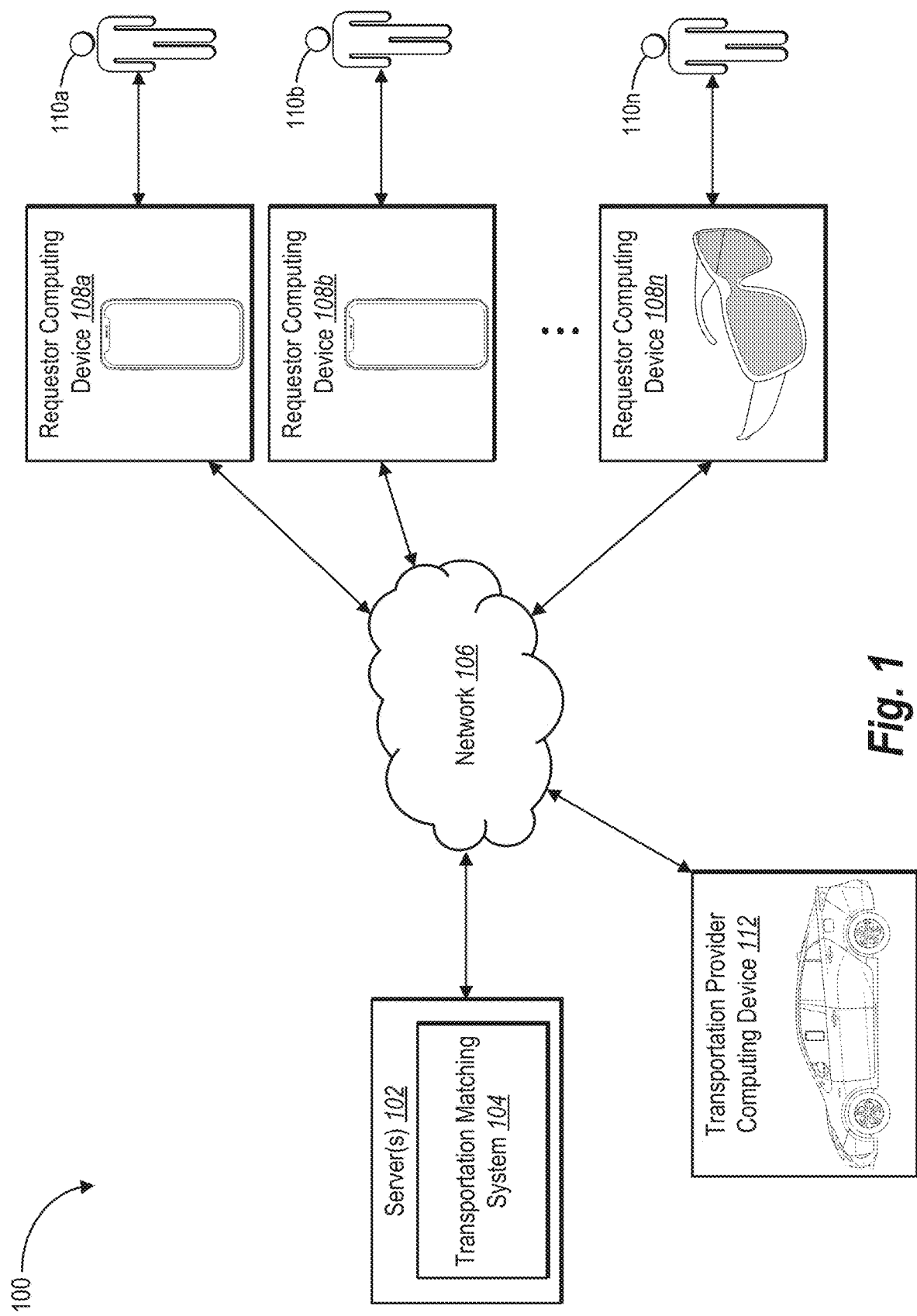
FIG. 1 illustrates a diagram of an environment in which a transportation matching system can operate in accordance with one or more embodiments.

One or more embodiments described herein provide benefits and solve one or more of the foregoing or other problems in the art with a transportation matching system that utilizes an image-based transportation request interface and environmental digital image stream to efficiently generate and provide pickup locations for requestor computing devices. In particular, in one or more embodiments, the transportation matching system utilizes an environmental digital image stream from a requesting device together with SLAM technology and digital images of known locations to determine an accurate location of a requesting device. In one or more embodiments, the transportation matching system further generates a pickup location augmented reality element (based on the location of the requesting device). By utilizing an augmented reality element, the transportation matching system can display the pickup location within an environmental scene (e.g., without a top-down digital map). In this manner, the transportation matching system can accurately and efficiently determine and provide pickup locations to requestor and/or provider computing devices.

As just mentioned, in one or more embodiments, the transportation matching system, captures an environmental digital image stream utilizing a camera of the requestor computing device. For example, instead of opening a map interface, the transportation matching system can identify that a requestor seeks to initiate a transportation request and cause the requestor computing device to capture an environmental digital image stream. Specifically, in one or more embodiments, the transportation matching system causes the requestor computing device (e.g., a mobile device) to capture an environmental digital image stream and display the digital image stream on the requestor computing device with instructions to capture the requestor's surrounding environment.

Upon capturing an environmental digital image stream, in one or more embodiments, the transportation matching system determines a requestor location based on an environmental digital image from the environmental digital image stream. For example, as described in greater detail below, the transportation matching system can utilize a SLAM approach to determine a location of a requestor computing device based on environmental digital images from the requestor computing device. For instance, the transportation matching system can utilize a SLAM approach to generate a three-dimensional representation from the digital image stream. The transportation matching system can compare the three-dimensional representation to known representations of various locations (generated from previously captured digital images) to determine the location of the requestor computing device.

Using the location of the requestor computing device, the transportation matching system can determine possible pickup locations (e.g., based on available provider computing devices and locations that transportation providers and requestors can converge). Furthermore, the transportation matching system can also determine other information such as, but not limited to, available transportation providers, costs, and/or an estimated time of arrival based on the determined location. The transportation matching system can also provide such information to the requestor computing device.

Upon determining the transportation pickup location based on the environmental digital image, the transportation matching system can also provide, for display on the requestor computing device, an augmented reality element at the transportation pickup location (e.g., within an environmental scene that includes the transportation pickup location). For instance, in some embodiments, the transportation matching system creates an augmented reality element that displays an indicator within the environmental scene (e.g., the scene that is being captured on the requestor computing device) where the transportation pickup location is located. Accordingly, the transportation matching system can provide the augmented reality element in a map-less interface to indicate the pickup location.

The transportation matching system can also create augmented reality directional elements that display a path to the transportation pickup location and/or information such as a cost and/or estimated time of arrival for a transportation request. In some embodiments, the transportation matching system can display the one or more augmented reality elements on one or more lenses of an augmented reality wearable device that is viewing the environmental scene (e.g., augmented reality glasses).

The transportation matching system can also monitor and update the location of the requestor computing device (e.g., as the requestor computing device moves toward a pickup location). Indeed, the transportation matching system can continue capturing digital images to identify updated requestor positions. In some embodiments, the transportation matching system utilizes dead reckoning approaches to determine relative movement of the requestor computing device from an initial location. For instance, the transportation matching system can utilize inertial measurement unit ("IMU"), directional, and/or velocity sensors to determine relative movement from an initial position (e.g., to determine when a requestor has reached a pickup location).

Furthermore, the transportation matching system can send a transportation request to a transportation provider device. Indeed, the transportation matching system can send a transportation request in response to detecting various events at the requestor device. For instance, upon detecting that the requestor is moving towards the transportation pickup location the transportation matching system can send a transportation request. Similarly, the transportation matching system can send a transportation request upon detecting interactions by the requestor with one or more augmented reality elements within the environmental scene, detecting that the requestor has arrived at a pickup location, or upon detecting another user interaction.

The disclosed transportation matching system provides several advantages over conventional systems. For example, the transportation matching system can determine a transportation pickup location with improved accuracy relative to conventional transportation systems. For instance, by utilizing an environmental digital image stream portraying a requestor's surrounding environment, the transportation matching system can accurately determine the location of the requestor computing device. For example, the transportation matching system can determine a specific side of the street and a particular location along a street, even in urban areas where urban canyons interfere with conventional GPS implementations. Additionally, the transportation matching system can also utilize the environmental digital image stream to determine a more accurate orientation of the requestor (e.g., which direction the requestor is facing) and utilize this information to provide more accurate information associated with the transportation request.

In addition to these accuracy improvements, the transportation matching system also improves efficiency by providing an image-based transportation request interface. For instance, by providing a user interface that utilizes an environmental digital image stream to determine a pickup location, the requestor can identify and/or verify their location when the requestor is unfamiliar with their current surrounding environment. Additionally, by utilizing augmented reality elements to indicate a transportation pickup location within a transportation service mobile-app, the transportation matching system reduces time and user interactions required to locate a transportation pickup location and/or other information associated with the transportation request. Indeed, in some embodiments, the transportation matching system enables a requestor to locate a transportation pickup location without having to use a map.

Additionally, the transportation matching system more efficiently utilizes computer resources in comparison to some conventional transportation systems. For instance, by providing a more accurate transportation pickup location, the transportation matching system utilizes less computer resources to facilitate communications between the transportation providers and requestors. Indeed, by enabling requestors and/or transportation providers to accurately locate a transportation pickup location via augmented reality elements, the transportation matching system can cause fewer errors, reduce communications (e.g., reduce GPS communications and calculations), and facilitate transportation requests with more efficiency and speed.

As illustrated by the foregoing discussion, the present disclosure utilizes a variety of terms to describe features and advantages of the transportation matching system. For reference, additional detail is now provided regarding the use of these terms. For example, as used herein, the term "transportation request" (sometimes referred to as "transportation service request") refers to a request configured by a requestor for transportation provided by a transportation provider. In particular, the term "transportation request" can include a request configured by a requestor computing device that includes a destination location and/or a pickup location, for transportation between those locations by a transportation provider. For example, a transportation request includes a request that is configured within a transportation service mobile-app for transportation services from a pickup location to a destination location.

Furthermore, as used herein, the term "initiate a transportation request" can include any action and/or interaction that indicates that a requestor is configuring and/or seeking a transportation provider to provide a transportation service. For example, initiating a transportation request can include selection of an option within an interface to request a transportation service, opening a transportation service mobile-app on a requestor computing device, and/or configuring a transportation request on a transportation service mobile-app. Upon completing a transportation request (e.g., finalizing information such as pickup location, ride-type, vehicle type, etc.), the transportation matching system can send a transportation request to a transportation provider computing device.

In addition, as used herein, the term "requestor computing device" (or sometimes referred to as "client device" or "requestor device") refers to a computing device associated with a requestor (e.g., a person who requests transportation services). In particular, a requestor computing device can include a computing device associated with a requestor that is capable of initiating a transportation request via a requestor application (e.g., a transportation service mobile-app). For example, a requestor computing device can include mobile devices such as, but not limited to a laptop, smartphone, or tablet and/or an augmented reality wearable device. Moreover, as used herein, the term "augmented reality wearable device" refers to a device capable of overlaying (or displaying) digital items (or augmented reality elements) into a real-world view and/or scene (e.g., an environmental scene). For example, an augmented reality device can include augmented reality glasses.

As used herein, the term "environmental digital image stream" (or sometimes referred to as "digital image stream") refers to one or more digital images that portray an environment. In particular, the term "environmental digital image stream" can include a plurality of digital images captured on a camera that portrays a live environmental scene (e.g., the environment that is within the vantage point of a camera). For example, an environmental digital image stream can include a video captured on a camera of a requestor computing device that captures the environment in which the requestor is positioned (e.g., a video stream, a live camera feed, etc.).

As used herein, the term "environmental digital image" (or sometimes referred to as "digital image") refers to a single frame (or image) captured from an environmental digital image stream. In particular, the term "environmental digital image" refers to an image, from an environmental digital image stream, that portrays and/or depicts an environmental scene in which the requestor is positioned. For instance, an environmental digital image can include, but is not limited to, a digital file with the following file extensions: JPG, TIFF, BMP, PNG, RAW, or PDF.

Moreover, as used herein, the term "environmental scene" (sometimes referred to as "environment scene") refers to an area corresponding to a requestor. In particular, the term "environmental scene" refers to an area, such as the immediate surrounding environment of a requestor when configuring a transportation request, that is capable of being viewed by the requestor and/or a camera of a requestor computing device. For instance, an environmental scene includes a street on which a requestor is located while configuring a transportation request from the requestor computing device (e.g., identifying a pickup location on the requestor computing device via an environmental digital image stream).

As used herein, the term "augmented reality element" refers to a visual element that overlays (or is within) an environmental scene. In particular, the term "augmented reality element" refers to a visual element (e.g., a digital image, digital graphic, digital video, etc.) that overlays (or is within) an environmental scene portrayed within a display that is capturing an environmental digital image stream and/or on a transparent medium that is facing the environmental scene (e.g., augmented reality glasses). For example, an augmented reality element includes a digital image corresponding to a transportation pickup location that is displayed within an environmental scene by overlaying the digital image within a display of an environmental digital image stream and/or on a transparent medium facing the environmental scene.

As used herein, the term "local movement information" refers to digital data reflecting movement of a device. For example, local movement information includes data from a step counter, IMU, accelerometer, changes in GPS on the requestor device, and/or changes in other signals such as, but not limited to, Bluetooth and WiFi. As outlined in greater detail below, the transportation matching system can utilize local movement information of a requestor computing device as part of a dead reckoning method to track intermediate locations of a requestor computing device (e.g., after determining a camera position based on a digital image stream).

Turning now to the figures, FIG. 1 illustrates an example environment 100 in which a transportation matching system 104 is implemented. As shown, the environment 100 includes requestor computing devices 108a-108n (sometimes referred to as simply "requestor computing devices 108") associated with requestors 110a-110n (sometimes referred to as simply "requestors 110") and a transportation provider computing device 112. As shown in FIG. 1, the transportation matching system 104 can be implemented on server device(s) 102. As further shown in FIG. 1, the requestor computing devices 108 and the transportation provider computing device 112 communicate with the transportation matching system 104 and/or each other via a network 106. Additional detail regarding the network 106 will be provided below in relation to FIGS. 13-14.

Although FIG. 1 illustrates the server device(s) 102, the requestor computing devices 108, and the transportation provider computing device 112 communicating via the network 106, the various components of the environment 100 can communicate and/or interact via other methods (e.g., the server device(s) 102 and the requestor computing devices 108 can communicate directly). Furthermore, although FIG. 1 illustrates the transportation matching system 104 being implemented by a particular component and/or device within the environment 100, the transportation matching system 104 can be implemented, in whole or in part, by other computing devices and/or components in the environment 100. Moreover, the server device(s) 102, the network 106, the requestor computing devices 108, and/or the transportation provider computing device 112 can include a variety of types of computing devices, including those explained below with reference to FIGS. 13 and 14.

As shown in FIG. 1, the server device(s) 102 can include the transportation matching system 104. In particular, the transportation matching system 104, as discussed in more detail below, can determine transportation pickup locations for requestor computing devices 108 based on environmental digital images and match transportation requests received from requestor computing devices 108 to a transportation provider (or transportation provider computing device 112). Furthermore, as discussed in more detail below, the transportation matching system 104 can provide augmented reality elements for display on requestor computing devices (and/or provider computing devices) to indicate transportation pickup locations in response to transportation requests.

Furthermore, each of the requestor computing devices 108a-108n and the transportation provider computing device 112 can include computing devices, such as, but not limited to mobile computing devices (e.g., a mobile phone), a tablet, augmented reality devices (e.g., a wearable augmented reality device such as augmented reality glasses), and/or vehicle computing devices. Additionally, each of the requestor computing devices 108a-108n and the transportation provider computing device 112 include transportation matching system applications (e.g., a mobile-app based transportation service application). Although FIG. 1 illustrates a certain number of requestor computing devices 108, transportation provider computing devices 112, and/or other components, the environment 100 can include any number of requestor computing devices 108, transportation provider computing devices 112, and/or other components of the environment 100.

For instance, the transportation matching system applications enable the requestors associated with the requestor computing devices 108a-108n and the transportation provider computing device 112 to interact with features of the transportation matching system 104. For instance, the requestor computing devices 108 can initiate transportation matching system application sessions, configure and/or send transportation requests, capture environmental digital image streams, and/or send environmental digital images to the transportation matching system 104. Furthermore, as discussed in greater detail below, the requestor computing devices 108 can receive information such as a transportation pickup location (based on environmental digital images) from the transportation matching system 104 and can also display augmented reality elements at the transportation pickup location in an environmental scene including the transportation pickup location. Moreover, the transportation provider computing device 112 can receive a transportation request and/or fulfill a transportation request using a transportation matching system application. In one or more embodiments, the transportation matching system application on the requestor computing devices 108 include features specific to requestors, while transportation matching system application on transportation provider computing device 112 include features specific to transportation providers.

Figure 2:
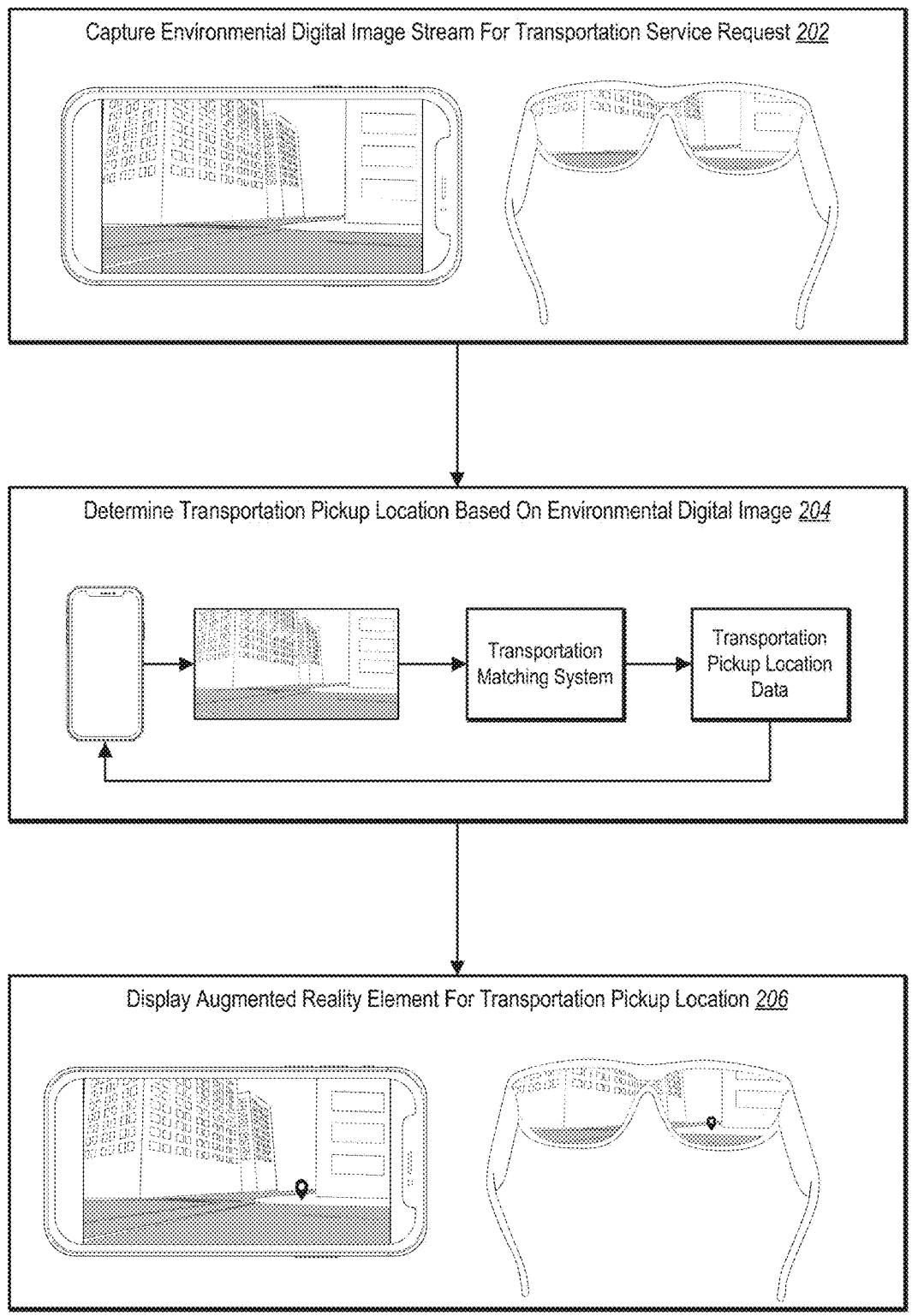
FIG. 2 illustrates an overview of the transportation matching system determining and displaying a transportation pickup location in accordance with one or more embodiments.

As mentioned above, the transportation matching system 104 can determine a transportation pickup location based on environmental digital images captured on a requestor computing device and cause the requestor computing device to display augmented reality elements at the transportation pickup location. For instance, FIG. 2 illustrates an overview of a sequence of acts that the transportation matching system 104 performs in relation to capturing an environmental digital image stream, determining a transportation pickup location based on an environmental digital image, and displaying augmented reality elements for the transportation pickup location on a requestor computing device. As mentioned, the acts performed by the transportation matching system 104 can be implemented by a variety of components (e.g., the server device(s) 102, the requestor computing devices 108, and/or the transportation provider computing devices 112).

For example, as shown in FIG. 2, the transportation matching system 104 performs an act 202 of capturing an environmental digital image stream for a transportation request on a requestor computing device. For instance, the transportation matching system 104 can receive an indication to initiate a transportation request from a requestor computing device and, in response, cause the requestor computing device to capture an environmental digital image stream to determine a transportation pickup location. Indeed, the transportation matching system 104 can provide instructions to share the requestors environment while capturing the environmental digital image stream. Additional detail regarding the transportation matching system 104 capturing an environmental digital image stream on a requestor computing device is described in greater detail in FIG. 3.

Furthermore, as illustrated in FIG. 2, the transportation matching system 104 performs an act 204 of determining a transportation pickup location based on an environmental digital image. For instance, the transportation matching system 104 can cause the requestor computing device to provide one or more environmental digital images from the environmental digital image stream to a remote server (e.g., the server device(s) 102). Furthermore, the transportation matching system 104 can analyze the one or more environmental digital images to determine information such as, but not limited to, a location of the requestor computing device, information regarding a transportation pickup location, information regarding an identified transportation provider, information regarding the transportation request, and/or information regarding the completion of the transportation request. Additionally, the transportation matching system 104 can provide such information determined from the one or more environmental digital images to the requestor computing device.

For example, the transportation matching system 104 can analyze a plurality of environmental digital images from an environmental digital stream and compare the environmental digital images to previously captured (known) digital images of various locations to determine the location of the requestor computing device. By comparing the environmental digital images captured by the requestor device and known digital images of various locations, the transportation matching system 104 can determine a precise location of the requestor. To illustrate, in some embodiments the transportation matching system 104 utilizes the environmental digital images to generate a representation of the environment surrounding a requestor computing device (e.g., utilizing SLAM approaches). The transportation matching system can compare this three-dimensional representation to known representations of various regions and identify where, in the environment, the requestor device is located. Additional detail regarding the transportation matching system 104 utilizing an environmental digital image to determine information associated with a transportation request (such as a transportation pickup location) is described in greater detail in FIG. 4.

In addition, as shown in FIG. 2, the transportation matching system 104 performs an act 206 of displaying augmented reality elements for a transportation pickup location. For instance, the transportation matching system 104 can cause the requestor computing device to display an augmented reality element at the determined transportation pickup location within an environmental scene. To illustrate, the transportation matching system 104 can generate a three-dimensional model of the environment surrounding the requestor. The transportation matching system 104 can then utilize the three-dimensional model to place the augmented reality element at the pickup location such that the requestor computing device (e.g., a mobile device or augmented reality glasses) display the augmented reality element in the proper location even as the requestor computing device moves within the environment. Additional detail regarding displaying augmented reality elements is described in greater detail below in FIGS. 5-10.

Figure 3:
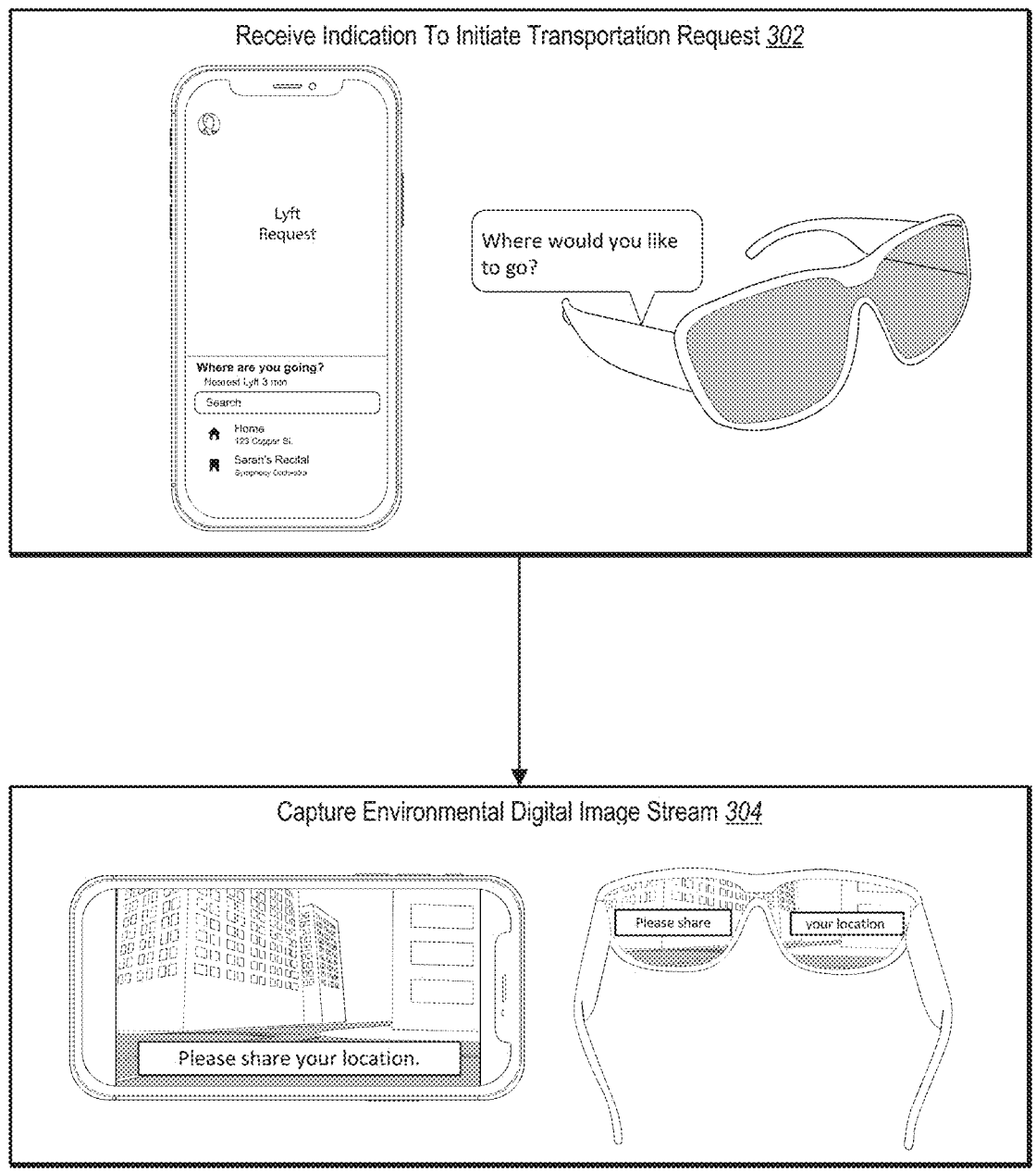
FIG. 3 illustrates a flowchart of the transportation matching system capturing an environmental digital image stream in accordance with one or more embodiments.

As mentioned above, the transportation matching system 104 can cause a requestor computing device to capture an environmental digital image stream. For instance, FIG. 3 illustrates the transportation matching system 104 capturing an environmental digital image stream (at an act 304) upon identifying an indication to initiate a transportation request on the requestor device (at an act 302).

The transportation matching system 104 can receive an indication to initiate a transportation request in a variety of ways. In relation to FIG. 3, the transportation matching system 104 receives user selection of a user interface element to initiate a request for transportation services. In other embodiments, the transportation matching system 104 can initiate a transportation request in response to other events (e.g., when a user executes a transportation service mobile-app, based on an audio command, or based on some other user interaction).

Upon receiving an indication to initiate a transportation request and/or an indication to provide a pickup location, the transportation matching system 104 can capture an environmental digital image stream on (or with) a requestor computing device to determine a pickup location. For example, FIG. 3 illustrates the transportation matching system 104 capturing an environmental digital image stream in act 304. In particular, in one or more embodiments, the transportation matching system 104 can utilize an environmental digital image stream captured on a camera of a requestor computing device to determine a pickup location without having a requestor provide information within a map-based user interface (i.e., a map-less user interface).

For instance, the environmental digital image stream can include a continuous feed of digital images (or frames) captured on a camera of a requestor computing device. In particular, in one or more embodiments, the environmental digital image stream includes a video captured by the camera of the requestor computing device. Indeed, the video captured by the camera of the requestor computing device can include a live video feed of the environment (e.g., the environmental scene) that the requestor currently is located during the transportation request.

Furthermore, in some embodiments, the transportation matching system 104 can display an environmental digital image stream on a requestor computing device while a camera of the requestor computing device captures the environmental digital image stream. Indeed, the transportation matching system 104 can display the environmental digital image stream within a user interface of the transportation matching application for selecting a pickup location and/or completing a transportation request. Additionally, in some embodiments, the transportation matching system 104 can cause the requestor computing device to capture the environmental digital image stream without displaying the environmental digital image stream on a display of the requestor computing device. For instance, the transportation matching system 104 may cause an augmented reality wearable device to utilize a camera to capture the environmental digital image stream without displaying the digital image stream. In particular, the augmented reality wearable device, through transparent lenses, may already be in view of the environmental scene captured by the camera of the augmented reality wearable device as the environmental digital image stream.

Additionally, the transportation matching system 104 can provide instructions via the requestor computing device while capturing the environmental digital image stream. For example, the transportation matching system 104 can provide instructions within a user interface that displays the environmental digital image stream during capture of the environmental digital image stream. Moreover, in some embodiments, the transportation matching system 104 utilizes augmented reality elements to provide instructions on the requestor computing device. For instance, the transportation matching system 104 can display instructions as one or more augmented reality elements within a display of an environmental digital image stream within the requestor computing device and/or on transparent lenses of an augmented reality wearable device that is viewing the environmental scene. In some embodiments, the transportation matching system 104 provides audio-based instructions via the requestor computing device while capturing the environmental digital image stream and/or any other portion of the transportation request process. Indeed, the transportation matching system 104 can provide instructions with any of or any combination of graphical user interface elements, augmented reality elements, and/or audio-based elements.

The transportation matching system 104 can provide a variety of instructions in association with capturing the environmental digital image stream and/or determining the pickup location. For example, the instructions can include requests and/or prompts that instructs the requestor to share their location. In particular, the instructions can include a prompt that instructs the requestor to position the camera of the requestor computing device to capture the environment of the requestor. Furthermore, in one or more embodiments, the transportation matching system 104 can provide instructions to capture, in the camera of the requestor computing device, a panoramic and/or 360-degree view of the requestor's current environment.

Figure 4:
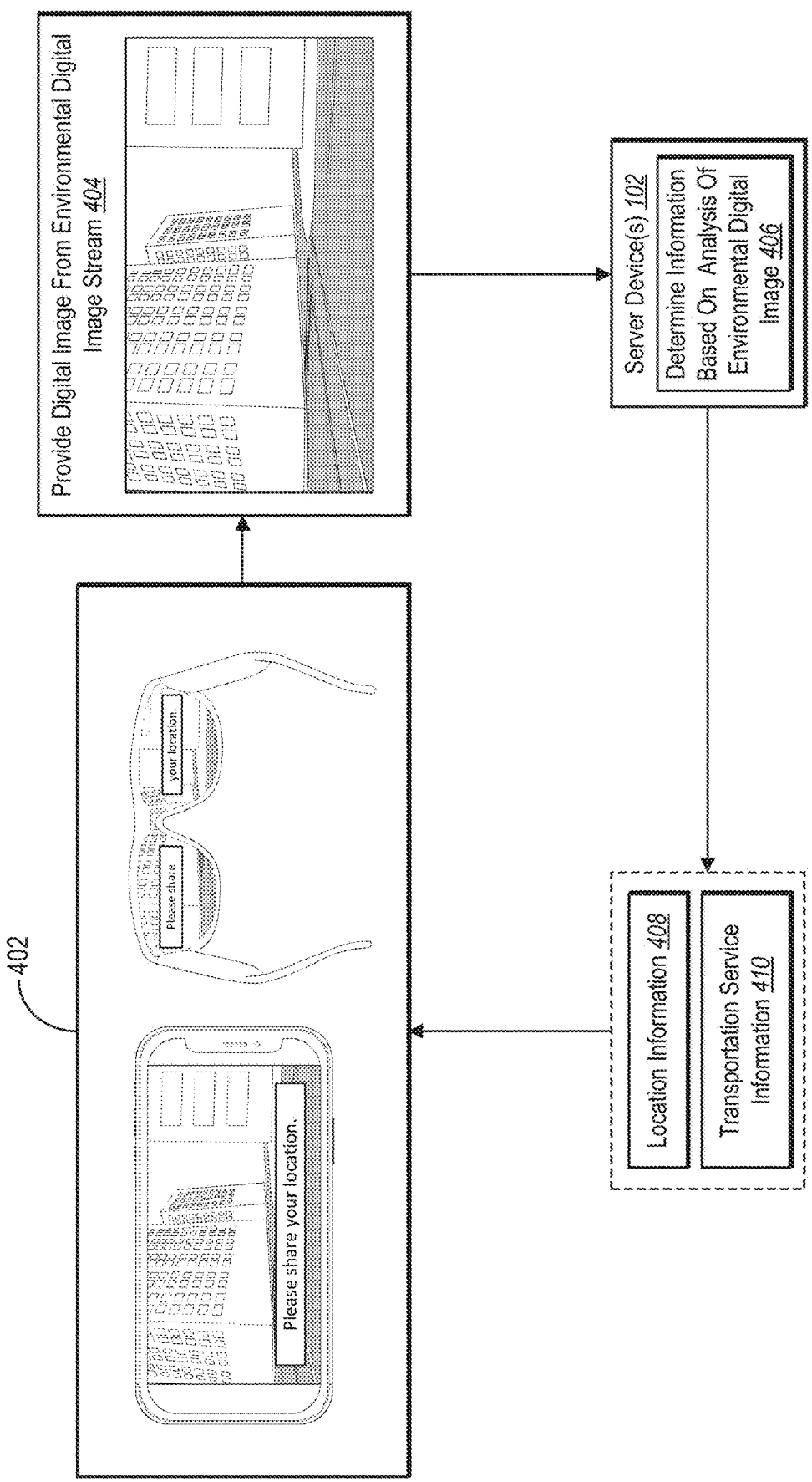
FIG. 4 illustrates a flowchart of the transportation matching system determining a transportation pickup location in accordance with one or more embodiments.

As mentioned above, the transportation matching system 104 can analyze an environmental digital image from an environmental digital image stream to determine a transportation pickup location. For example, FIG. 4 illustrates the transportation matching system 104 determining a transportation pickup location based on an environmental digital image. More specifically, FIG. 4 illustrates the transportation matching system 104 receiving an environmental digital image from a requestor computing device that is capturing an environmental digital image stream, determining information for the transportation request (e.g., a requestor computing device location and a transportation pickup location) by analyzing the environmental digital image, and providing the information related to the transportation request to the requestor computing device.

In one or more embodiments, the transportation matching system 104 causes a requestor computing device to provide one or more environmental digital images to a remote server to analyze the one or more environmental digital images. For instance, as shown in FIG. 4, the transportation matching system 104 can cause the requestor computing device 402 (which can include a mobile device and/or an augmented reality wearable device), that is capturing an environmental digital image stream, to provide an environmental digital image (at an act 404) to the server device(s) 102.

For instance, the transportation matching system 104 can receive one or more digital images captured from the environmental digital image stream as the one or more environmental digital images (e.g., frames). In some embodiments, the transportation matching system 104 selects the one or more digital images based on rules configured by the transportation matching system 104. For example, the transportation matching system 104 can cause the requestor computing device 402 to provide a digital image at each interval frame of the environmental digital image stream. In some embodiments, the transportation matching system 104 causes the requestor computing device to provide a digital image based on quality of the digital image (or frames) of the environmental digital image stream. For example, the transportation matching system 104 can receive one or more digital images that are determined to be high quality images (e.g., images that are sharp, have minimal blur, are bright, etc.) from a requestor computing device.

In addition to the environmental digital image, the transportation matching system 104 can receive other information associated with the transportation request from the requestor computing device. For instance, the requestor computing device can provide other information such as global position system information (GPS), selected destination for the transportation request, selected ride type, selected vehicle type, and/or schedule information. Moreover, the requestor computing device can provide other location based information such as WiFi connection information (e.g., for determining location based on triangulation). Additionally, the requestor computing device can also provide requestor account information such as, but not limited to, transportation request preferences, demographics, and/or an age of the requestor.

Upon receiving an environmental digital image from an environmental digital image stream captured on a requestor computing device, the transportation matching system 104 can utilize the environmental digital image to determine a requestor computing device location. Additionally, the transportation matching system 104 can utilize the determined requestor computing device location, from the environmental digital image, to determine various other information associated with a transportation request (e.g., a transportation pickup location). For example, FIG. 4 illustrates the transportation matching system 104 determining information based on an analysis of the environmental digital image in act 406 (on server device(s) 102) to provide location information 408 and transportation service information 410 to the requestor computing device 402.

For instance, the transportation matching system 104 can utilize image recognition applications and/or algorithms such as, but not limited to, structure from motion or imagery simultaneous localization and mapping (SLAM), to determine the location of the requestor computing device. In particular, the transportation matching system 104 can utilize SLAM approaches to analyze digital images and determine a model of an environment portrayed in the digital images as well as positions of the camera device(s) utilized to capture the digital images. Thus, the transportation matching system 104 can utilize SLAM to determine a model of an environment as well as positional locations (e.g., in a 2D plane) for devices utilized to capture the digital images. For instance, the transportation matching system 104 can utilize SLAM to compare one or more environmental digital images (or three-dimensional representations of the one or more environmental images) to one or more known digital images (or known three-dimensional representations) corresponding to various locations to determine the location of a requestor computing device.

For example, in some embodiments, upon receiving one or more environmental digital images from an environmental digital image stream, the transportation matching system 104 utilizes SLAM to generate three-dimensional representations from the one or more environmental digital images. In some embodiments, the transportation matching system 104 utilizes SLAM to generate three-dimensional point cloud collection data (of the environment of the requestor) from the one or more environmental digital images.

In or more embodiments, the transportation matching system 104 compares such three-dimensional representations from the one or more environmental digital images to a repository of known three-dimensional representations of various regions to identify where, in the environment, a requestor computing device is located. For example, the transportation matching system 104 can utilize a repository of known three-dimensional representations of various regions that was generated based on scans (e.g., image capture, LiDAR, and/or sonar) of various regions utilizing SLAM approaches and known location information. In particular, the repository of known three-dimensional representations of various regions includes three-dimensional models of the various regions with corresponding location information.

For instance, in one or more embodiments, the transportation matching system 104 can gather digital images and corresponding location information from various environments to generate a repository of known digital images (and/or known three-dimensional representations). Indeed, the known digital images (and/or known three-dimensional representations) can be labelled and/or tagged with location information. For instance, in some embodiments, the transportation matching system 104 utilizes SLAM to generate three-dimensional representations of various environments with corresponding location data based on scans (e.g., captured images, LiDAR, and/or Sonar) of real-world environments (e.g., streets, buildings, objects, and/or neighborhoods) for the repository of known three-dimensional representations of various regions.

As an example, the transportation matching system 104 can gather scans and location information from a vehicle that includes scanning equipment to generate the repository of known three-dimensional representations of various environments. For instance, the transportation matching system 104 can utilize LiDAR equipment, 3D camera systems, and/or 360-degree camera systems on a vehicle to scan various environments (e.g., the streets of a city) to generate the repository of known digital images of various environments (or known three-dimensional representations of various environments). Furthermore, the transportation matching system 104 can utilize location information from the vehicle that scans the various environments (at the time of the scans) to generate corresponding location information for the known digital images of various environments (or known three-dimensional representations or various environments).

Furthermore, as mentioned above, the transportation matching system 104 can compare the one or more environmental digital images (or three-dimensional representations generated from the one or more environmental digital images) to a repository of one or more known digital images of various environments (or known three-dimensional representations of various environments) to determine the location of a requestor computing device. For instance, in or more embodiments, the transportation matching system 104 can utilize SLAM to compare the features (or data points) of the digital images (or three-dimensional representations) generated from the requestor computing device to features of the digital images (or three-dimensional representations) generated from the repository of known three-dimensional representations of various environments. Based on this comparison, the transportation matching system 104 can determine a location of the requestor computing device utilized to capture the environmental digital images.

Indeed, based on identifying common features (e.g., traffic signs, street signs, street lights, curbs, no parking areas, fire hydrants, bus stops, and/or other objects), the transportation matching system 104 can align the three-dimensional representation generated from the one or more environmental digital images with the three-dimensional representation of the known environment. Furthermore, in some embodiments, the transportation matching system 104 utilizes a 2D vector map that corresponds to the aligned three-dimensional representation of the known environment to determine a location of the requestor computing device based on the positioning of the camera (or vantage point) of the requestor computing device within the three-dimensional representation generated from the one or more environmental digital images.

Additionally, the transportation matching system 104 can determine confidence scores to one or more determined locations for a requestor device (e.g., based on the level of alignment between corresponding features). Indeed, the transportation matching system 104 can determine confidence scores to the one or more determined locations to determine the most accurate location of the environmental digital image (or requestor computing device). In some embodiments, the transportation matching system 104 utilizes other information associated with (or provided by) the requestor computing device to assign confidence scores to the identified locations. For instance, the transportation matching system 104 can utilize information such as GPS location, a destination location selected by the requestor, and a transportation request history of the requestor to assign confidence scores to the identified matches (e.g., the transportation matching system 104 can assign a higher confidence score to an identified location from the image recognition methods that corroborates with, or is in the proximity, of the GPS location provided by the requestor computing device).

Rather than analyze all potential locations, in some embodiments, the transportation matching system 104 can analyze a subset of locations to more quickly and efficiently identify a requestor location. For example, the transportation matching system 104 can filter known locations based on information regarding the requestor's general location prior to analyzing a digital image stream to determine a requestor location. For instance, the transportation matching system 104 can utilize general or historical GPS information, selected destination location, WiFi connection information, transportation request history of the requestor, an event calendar of the requestor, historical locations of a requestor, and/or demographic information of the requestor to filter and/or fine tune the known three-dimensional representations and/or known digital images of various environments utilized to determine a location of the requestor computing device. In particular, the transportation matching system 104 can utilize this other location information to identify a proximal location of the requestor computing device and utilize SLAM to identify a specific location corresponding to the proximal location.

In one or more embodiments, the transportation matching system 104 utilizes tagging elements situated on objects in the real-world environment to identify locations based on an environmental digital image. For instance, in one or more embodiments, the transportation matching system 104 can utilize tagging elements such as a quick response code (QR code) stickers situated on objects in an environment (e.g., QR code stickers placed on light poles on a street) to identify the location of the environmental scene portrayed in an environmental digital image. For example, the transportation matching system 104 can identify the tagging element such as the QR code within the environmental digital image and scan the QR code to identify the location of the requestor computing device. Indeed, each QR code can represent a specific location.

Furthermore, the transportation matching system 104 may request additional environmental digital images from the requestor computing device when the transportation matching system 104 is unable to determine a location from a provided environmental digital image. For example, if confidence scores fail to satisfy a confidence threshold, the transportation matching system 104 can cause the requestor computing device to continue to capture additional environmental digital images. In addition, the transportation matching system 104 can cause the requestor computing device to display instructions to instruct the requestor to capture additional perspectives of the environmental scene in the environmental digital image stream. For instance, upon not determining a location from an environmental digital image, the transportation matching system 104 can provide instructions to capture a panoramic environmental digital image on the requestor computing device. The transportation matching system 104 can utilize the additional environmental digital images to determine the location of the requestor computing device.

Additionally, upon determining the current location of the requestor computing device based on the one or more environmental digital images, the transportation matching system 104 can identify additional information. For example, utilizing the current location and the transportation request information provided by the requestor computing device the transportation matching system 104 can perform a transportation matching analysis. In particular, the transportation matching system 104 can utilize the location determined from the environmental digital image and/or the transportation request information (e.g., a destination location, a ride type, a vehicle type, etc.) to identify one or more transportation providers to service the transportation request. Indeed, the transportation matching system 104 can utilize a number of methods to determine an optimal matching transportation provider for the transportation request (e.g., nearest transportation providers, transportation providers with the lowest ETA, transportation providers that have been waiting the longest, etc.).

Furthermore, in one or more embodiments, the transportation matching system 104 can determine a pickup location. For example, the transportation matching system 104 can utilize the current location, the transportation request information provided by the requestor computing device, and the one or more identified transportation providers to determine a transportation pickup location for the requestor (within the environment portrayed in the environmental digital image and/or based on the determined location of the requestor computing device). For instance, the transportation matching system 104 can identify the orientation of the requestor in relation to the current determined location, the orientation of the one or more identified transportation providers, the traffic rules and/or customs for the location depicted in the environmental digital image, and/or other objects within the environmental digital image (e.g., traffic signs, street signs, street lights, curbs, no parking areas, fire hydrants, bus stops, no stopping areas, etc.). Furthermore, the transportation matching system 104 can utilize such information to determine one or more transportation pickup locations within the environmental scene of the current location of the requestor computing device and/or near the current location of the requestor computing device.

For instance, in one or more embodiments, the transportation matching system 104 can identify a transportation provider that can service the transportation request from the current location of the requestor computing device. Then, the transportation matching system 104 can determine a route from the current location of the identified transportation provider to the current location of the requestor computing device. Furthermore, the transportation matching system 104 can utilize the determined route, the orientation of the requestor in relation to the current location of the requestor, the traffic rules and/or customs for the location depicted in the environmental digital image, and/or other objects within the environmental digital image (e.g., traffic signs, street signs, street lights, curbs, no parking areas, fire hydrants, bus stops, etc.) to determine a transportation pickup location. In one or more embodiments, the transportation matching system 104 can determine multiple transportation pickup locations for multiple identified transportation providers.

In one or more embodiments, the transportation matching system 104 identifies designated (or standard) transportation pickup locations within the environmental scene of the current location of the requestor computing device and/or near the current location of the requestor computing device. In particular, the transportation matching system 104 can utilize a collection (or set) of preexisting, known transportation pickup locations (e.g., a transportation pickup location assigned for a location) as designated transportation pickup locations. Furthermore, in some embodiments, the transportation matching system 104 may include designated transportation provider locations for specific ride types, such as shared ride (e.g., ride pool). For example, the transportation matching system 104 can identify that an environmental digital image (or current location) includes a specific building and can identify that a designated transportation pickup location exists in the determined location of the environmental digital image at that specific building. As a result, the transportation matching system 104 can provide the designated transportation pickup location to the requestor computing device in response to the environmental digital image.

Upon identifying transportation providers, the transportation matching system 104 can also determine information regarding the transportation service (e.g., pickup information) for each transportation provider. For instance, as mentioned above, the transportation matching system 104 can determine a travel route, ETA, ride type (e.g., single-user ride or multi-user rides) or vehicle type corresponding to different transportation providers. Similarly, the transportation matching system 104 can determine a cost of the transportation service (e.g., a cost to transport a requestor from the pickup location to a destination location utilizing the transportation provider).

The transportation matching system 104 can utilize information regarding the transportation service (in addition to information gleaned from the environmental digital images) to rank and select one or more pickup locations and/or transportation providers. For example, the transportation matching system 104 can rank a pickup location and/or transportation provider based on distance between a requester and a pickup location, time to travel to the pickup location, ETA, cost, ride types available, and/or vehicle types available. Furthermore, the transportation matching system 104 can utilize (or provide) any number of transportation pickup locations in response to the environmental digital image provided by the requestor computing device. In some embodiments, the transportation matching system 104 utilizes a threshold number of transportation pickup location based on one or more of the attributes (or factors) discussed above (e.g., the cost, estimated time of arrival, transportation provider rankings, etc.).

For instance, as shown in FIG. 4, the requestor computing device provides to server device(s) 102 an environmental digital image that depicts an environmental scene in which the requestor is positioned (e.g., a street corner with buildings) (at an act 404). Then, the transportation matching system 104 analyzes the environmental digital image to determine the current location of the requestor (e.g., the physical location corresponding to the street corner depicted within the environmental digital image). Furthermore, the transportation matching system 104 determines a transportation pickup location within the environmental scene portrayed in the environmental digital image and/or based on the location of the environmental digital image. For instance, the transportation matching system 104 can determine a transportation pickup location across the street (within the environmental scene portrayed in the environmental digital image provided in act 404) near the building across the street based on identifying that a transportation provider is travelling towards the building.

Furthermore, as illustrated in FIG. 4, the transportation matching system 104 determine and provide transportation service information 410. For example, the transportation matching system 104 can provide the estimated time of arrival for the transportation provider, the distance of the transportation provider to the current location of the requestor computing device, distance to the transportation pickup location, ride type, vehicle type, cost, and/or the total time to complete the transportation request.

In addition, the transportation matching system 104 can also compare information across different transportation providers and/or pickup locations. For example, the transportation service information 410 can include comparisons between ETAs and/or costs of multiple transportation pickup locations, ride types, and/or matched transportation providers. Indeed, the transportation matching system 104 can provide such information (e.g., the location information 408 and/or the transportation service information 410) to enable creation and/or display of augmented reality elements on the requestor computing device (e.g., indicate where in the environmental scene the transportation pickup location is positioned).

Figure 5A:
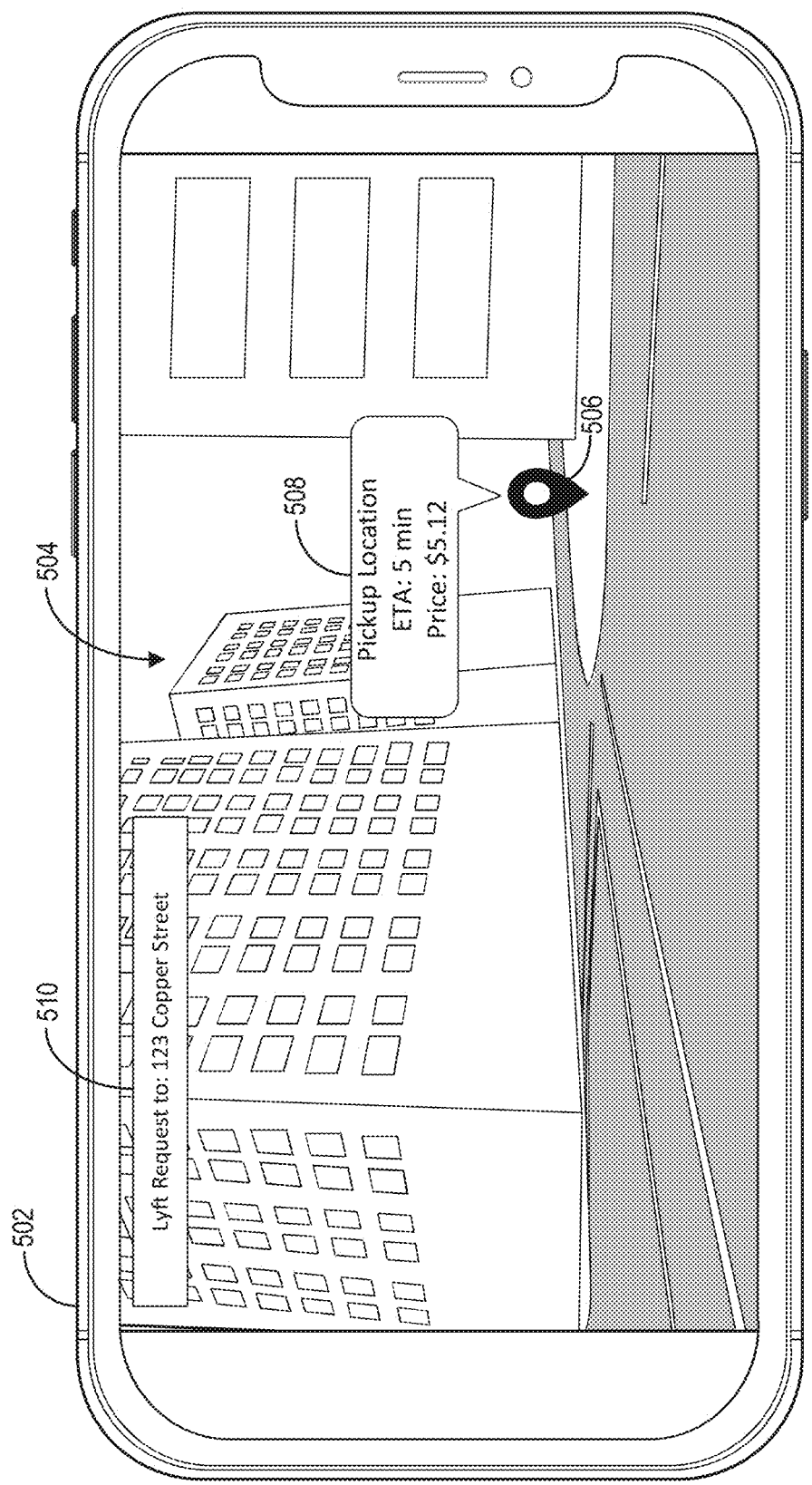
FIGS. 5A and 5B illustrate the transportation matching system displaying an augmented reality element within an environmental scene at a transportation pickup location in accordance with one or more embodiments.

As mentioned above, the transportation matching system 104 can provide, for display on a requestor computing device, an augmented reality element at the transportation pickup location within an environmental scene that includes the transportation pickup location. For instance, FIG. 5A illustrates the transportation matching system 104 providing an augmented reality element for display on a requestor computing device based on a transportation pickup location. In particular, FIG. 5A illustrates the transportation matching system 104 providing an augmented reality element 506 at a determined transportation pickup location for display on a requestor computing device 502 within an environmental scene 504.

As shown in FIG. 5A, the environmental scene 504 is captured within an environmental digital image stream from the camera of the requestor computing device 502 and displayed on the screen of the requestor computing device 502. Indeed, as shown in FIG. 5A, the transportation matching system 104 can also include an augmented reality element 508 that includes transportation service information such as an ETA (e.g., "ETA: 5 min") and a cost (e.g., "Price: $5.12") for the transportation pickup location corresponding to a transportation request. Moreover, as shown in FIG. 5A, the transportation matching system 104 can include a graphical user interface element 510 to display information corresponding to the transportation request (e.g., "Lyft Request to: 123 Copper Street").

In one or more embodiments, the transportation matching system 104 causes the requestor computing device to create (or generate) augmented reality elements based on the information determined from the environmental digital image (as described above). For instance, the transportation matching system 104 causes the requestor computing device to create (or generate) augmented reality elements based on information such as, but not limited to, a determined transportation pickup location, a current location of the requestor computing device, costs of the transportation request, ETAs corresponding to the transportation requests, information of a matched transportation provider, and/or a countdown timer for the transportation request (e.g., the amount of time the transportation request will stay available). Furthermore, the augmented reality elements can update to relay information such as time changes and/or other information changes (e.g., a change in ETA and/or a countdown timer). Indeed, the transportation matching system 104 can cause the requestor computing device to display such information as one or more augmented reality elements within an environmental scene that is relevant to such information (e.g., an environmental scene that includes the transportation pickup location within the scene).

In one or more embodiments, the transportation matching system 104 provides the determined transportation pickup location with corresponding data to identify where, within an environmental digital image, the transportation pickup location is located. For example, the transportation matching system 104 can cause the requestor computing device to create (or display) an augmented reality element (e.g., a pointer, a cone, a flag, etc.) within an environmental scene associated with the environmental digital image at the transportation pickup location based on the data that identifies where within the environmental digital image the transportation pickup location is located. Indeed, by displaying an augmented reality element at the transportation pickup location within an environmental scene, a requestor is able to identify where the transportation pickup location is within their surroundings without utilizing a map and/or other information.

Moreover, the transportation matching system 104 can cause the requestor computing device to update the positioning of augmented reality elements within the environmental scene based on changes in orientation of the respondent computing device. For instance, the transportation matching system 104 can cause the requestor computing device to update the positioning of the augmented reality element that indicates a transportation pickup location to remain located at the transportation pickup location as the environmental scene changes. For instance, the environmental scene changes can result from movement of the requestor, movement of a view point of the requestor computing device, and/or movement of the camera of the requestor computing device.

Additionally, the transportation matching system 104 can cause the requestor computing device to display other information as augmented reality elements and/or graphical user interface elements within an environmental scene. For example, the transportation matching system 104 can cause the requestor computing device to display information such as information corresponding to the transportation request. In particular, the displayed information can include a destination location and/or options selected by the requestor for the transportation request (e.g., a ride type, a vehicle type, etc.).

Moreover, the transportation matching system 104 can cause the requestor computing device to display augmented reality elements and/or graphical user interface elements that point towards (or guide towards) a determined transportation pickup location. For instance, the transportation matching system 104 can identify that the transportation pickup location is not within the current environmental scene portrayed in the environmental digital image stream on the requestor computing device (e.g., the requestor changed orientation and/or moved the vantage point of the camera). Upon identifying that the transportation pickup location is not within the current environmental scene, the transportation matching system 104 can cause the requestor computing device to display augmented reality elements and/or graphical user interface elements (e.g., arrows, pointers, text, etc.) that instruct the requestor to move the requestor computing device camera in the direction of the environmental scene that includes the transportation pickup location to display the augmented reality element corresponding to the transportation pickup location.

Furthermore, the transportation matching system 104 can cause the requestor computing device to display information such as a confirmation and/or transportation provider information (e.g., information corresponding to the transportation provider that will service the transportation request). In particular, the transportation matching system 104 can display such information upon sending the transportation request to a transportation provider for the determined transportation pickup location (e.g., the transportation pickup location displayed as the augmented reality element).

In one or more embodiments, the transportation matching system 104 can identify interactions with the augmented reality elements. Indeed, the augmented reality elements and/or the displayed environmental scene can include selectable elements corresponding to the positions of the augmented reality elements. For instance, the transportation matching system 104 can identify interactions on a touchscreen of a requestor computing device at positions corresponding to augmented reality elements displayed within an environmental scene on the touchscreen display. Indeed, the transportation matching system 104 can send a transportation request to a transportation provider for the transportation pickup location that is selected by the requestor via an interaction with the touchscreen display of the requestor computing device.

In some embodiments, the transportation matching system 104 can detect interactions such as gestures within an environmental digital image stream that is capturing the environmental scene in which the transportation pickup location and corresponding augmented reality elements are positioned (or displayed). For instance, the transportation matching system 104 can detect a hand of the requestor, within the environmental digital image stream that is capturing the environmental scene, pointing at the augmented reality element corresponding to the transportation pickup location. In particular, the transportation matching system 104 can send the transportation request to a transportation provider for the transportation pickup location based on detecting gestures such as the requestor pointing at the augmented reality element within the environmental digital image stream. Additionally, the transportation matching system 104 can send the transportation request to a transportation provider upon identifying that the requestor is moving towards the determined transportation pickup location (as described in greater detail in FIG. 8).

Figure 5B:
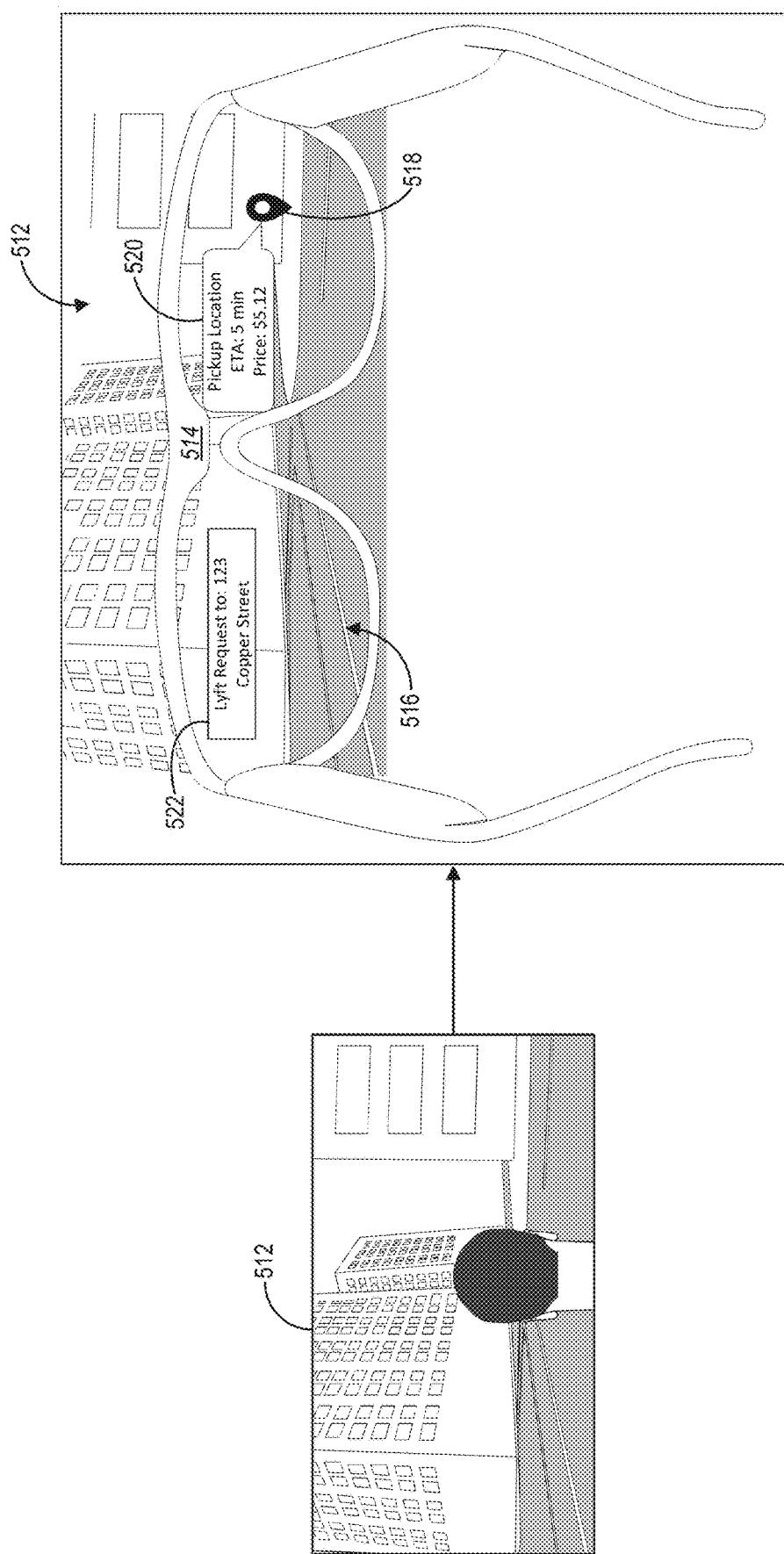

In addition, as mentioned above, the transportation matching system 104 can display one or more augmented reality elements on an augmented reality wearable device that is viewing the environmental scene (e.g., viewing the environmental scene via a camera of the augmented reality wearable device that is capturing an environmental digital stream). For instance, FIG. 5B illustrates the transportation matching system 104 displaying an augmented reality element at a determined transportation pickup location, within an environmental scene, through an augmented reality wearable device (e.g., augmented reality glasses with transparent lenses that enable a requestor to view an environment and/or environmental scene). Indeed, the transportation matching system 104 can display one or more augmented reality elements and/or provide other functionalities on an augmented reality wearable device in accordance with one or more embodiments described above. In particular, the transportation matching system 104 can cause an augmented reality wearable device to display one or more augmented reality elements portraying information such as, but not limited to, information regarding transportation pickup location, information regarding an identified transportation provider, information regarding the transportation request, and/or information regarding the completion of the transportation request as described above in FIG. 5A.

For example, FIG. 5B illustrates the requestor 110a within an environment 512 (e.g., an urban area). Furthermore, as shown in FIG. 5B, the requestor 110a views the environment 512 with augmented reality glasses 514. As illustrated in FIG. 5B, the transportation matching system 104 can also cause the augmented reality glasses 514 to display an augmented reality element 518 (e.g., a pin) within an environmental scene 516 (e.g., the view of the environment 512 through a transparent lens of the augmented reality glasses 514). In addition, as shown in FIG. 5B, the transportation matching system 104 can cause the augmented reality glasses 514 to display the augmented reality element 518 at a determined transportation pickup location within the environmental scene 516.

Moreover, as shown in FIG. 5B, the transportation matching system 104 can cause the augmented reality glasses 514 to display information in an augmented reality element 520 (e.g., a pickup location indication, an ETA, and a price of the transportation service request from the transportation pickup location). Furthermore, as illustrated in FIG. 5B, the transportation matching system 104 can cause the augmented reality glasses 514 to display, as an augmented reality element and/or graphical user interface, information 522 (e.g., the transportation request information "Lyft Request to: 123 Copper Street"). Indeed, the information 522 can include a variety of information such as, but not limited to, information regarding transportation pickup location, information regarding the identified transportation provider, information regarding the transportation request, and/or information regarding the completion of the transportation request.

Furthermore, the transportation matching system 104 can identify interactions and/or actions of a requestor (e.g., the requestor 110a) with an augmented reality wearable device (e.g., the augmented reality glasses 514). For example, as described above, the transportation matching system 104 can identify gestures of the requestor within an environmental scene (e.g., the environmental scene 516) that is in view of the augmented reality wearable device. For instance, the transportation matching system 104 can identify a hand of the requestor, within the environmental scene, pointing at an augmented reality element corresponding to a transportation pickup location (e.g., the augmented reality element 518). Moreover, the transportation matching system 104 can identify voice commands via the augmented reality wearable device from the requestor. Furthermore, the transportation matching system 104 can also identify that the requestor is moving towards the determined transportation pickup location (as described in greater detail in FIG. 8). Indeed, as described in one or more embodiments herein, the transportation matching system 104 can send a transportation request to a transportation provider based on the interactions and/or the actions of the requestor with the augmented reality wearable device.

Figure 6:
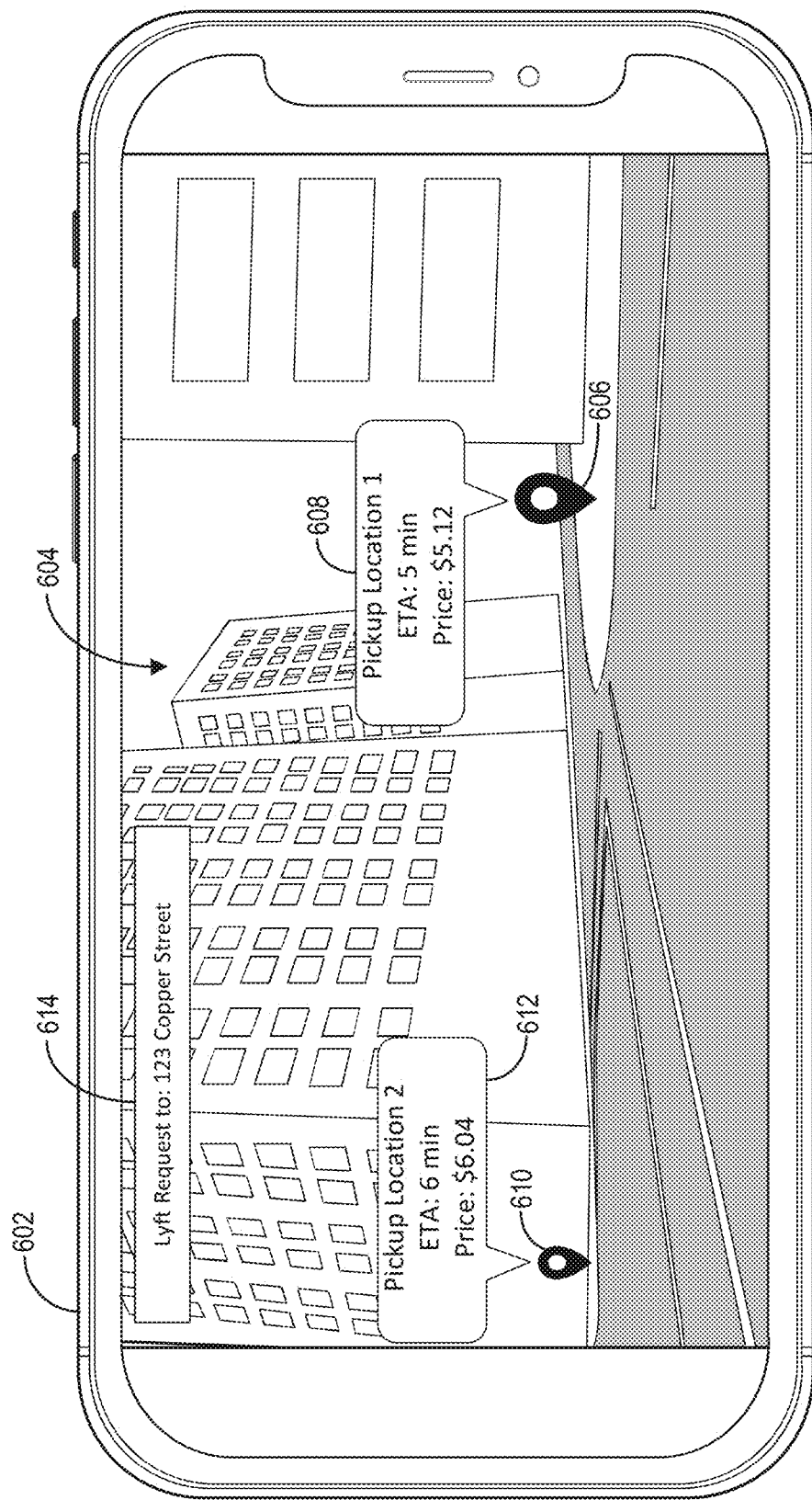
FIG. 6 illustrates the transportation matching system displaying multiple augmented reality elements within an environmental scene at multiple transportation pickup locations in accordance with one or more embodiments.

Additionally, the transportation matching system 104 can cause a requestor computing device to display multiple augmented reality elements for multiple determined transportation pickup locations within an environmental scene. For instance, FIG. 6 illustrates the transportation matching system 104 causing a requestor computing device to display multiple augmented reality elements for multiple determined transportation pickup locations. In particular, the transportation matching system 104 can indicate multiple transportation pickup locations within an environmental scene, can display information based on comparisons and/or analysis of one or more available transportation services available at the transportation pickup locations, and/or display other information corresponding to the multiple transportation pickup locations. Furthermore, the transportation matching system 104 can also identify interactions from a requestor to enable selections (or interactions) with the multiple augmented reality elements and/or transportation pickup locations. Additionally, although FIG. 6 illustrates the transportation matching system 104 providing multiple augmented reality elements on a mobile device, the transportation matching system 104 can similarly display multiple augmented reality elements, multiple transportation pickup locations, comparison information, and/or other information described herein on an augmented reality wearable device (e.g., as described in FIG. 5B).

As mentioned above, the transportation matching system 104 can cause a requestor computing device to display multiple augmented reality elements, within an environmental scene, at multiple transportation pickup locations. For instance, as shown in FIG. 6, the transportation matching system 104 can cause a requestor computing device 602 (e.g., a mobile device) to display an augmented reality element 606 at a first transportation pickup location and an augmented reality element 610 at a second transportation pickup location within the environmental scene 604. Additionally, as shown in FIG. 6, the transportation matching system 104 can cause the requestor computing device 602 to display information 608 (e.g., "Pickup Location 1," "ETA: 5 min," and "Price: $5.12") corresponding to the first transportation pickup location and information 612 (e.g., "Pickup Location 2," "ETA: 6 min," and "Price: $6.04") corresponding to the second transportation pickup location as augmented reality elements within the environmental scene 604. Additionally, as shown in FIG. 6, the transportation matching system 104 can cause the requestor computing device 602 to display, as an augmented reality element and/or graphical user interface, information 614 (e.g., the transportation request information "Lyft Request to: 123 Copper Street"). Indeed, the information 614 can include, but is not limited to, information regarding transportation pickup location, information regarding the identified transportation provider, information regarding the transportation request, and/or information regarding the completion of the transportation request.

In one or more embodiments, the transportation matching system 104 determines multiple transportation pickup locations and displays augmented reality elements within an environmental scene at each of transportation pickup locations as described in the figures above. Furthermore, although FIG. 6 illustrates the transportation matching system 104 displaying augmented reality elements for two transportation pickup locations, the transportation matching system 104 can cause a requestor computing device to display any number of augmented reality elements at any number of transportation pickup locations. In addition, the transportation matching system 104 can display (or provide) the same and/or different information and/or different transportation service options at each of the transportation pickup locations based on transportation provider matching analyses performed by the transportation matching system 104.

Furthermore, the transportation matching system 104 can cause a requestor computing device to display augmented reality elements and/or graphical user interface elements with alternative or additional information. For instance, the transportation matching system 104 can cause the requestor computing device to display comparisons between multiple transportation pickup locations and/or transportation service options as augmented reality elements and/or graphical user interface elements. As an example, in one or more embodiments, the transportation matching system 104 calculates differences between multiple transportation pickup locations (e.g., a difference in ETA and/or price) and causes the requestor computing device to display the calculated information as an augmented reality and/or graphical user interface element within the environmental scene. For instance, the transportation matching system 104 can display a primary transportation pickup location and display other transportation pickup locations with a calculated comparison such as "this pickup location costs $4.00 less" within an environmental scene. Moreover, in some embodiments, the transportation matching system 104 causes the requestor computing device to display augmented reality elements to highlight the best available transportation pickup location (e.g., the most efficient pickup location and/or most cost-effective pickup location for the requestor).

In addition, the transportation matching system 104 can base the calculated information (or comparisons) on requestor preferences. For instance, the transportation matching system 104 can determine that a requestor prefers faster ETAs rather than price, and as a result, the calculated information displayed to the requestor (via augmented reality elements and/or graphical user interface elements within an environmental scene) can include information on differences in ETA times between multiple transportation pickup locations. Indeed, the preferences can include, but are not limited to, ETA preferences, price preferences, vehicle type preferences, ride type preferences, etc.

Additionally, the transportation matching system 104 can cause the requestor computing device to inform and/or notify a requestor of other available transportation service options via augmented reality elements (and/or graphical user interface elements). For example, the transportation matching system 104 can cause the requestor computing device to display augmented reality elements and/or graphical user interface elements to notify and/or inform a requestor of other available transportation services and/or transportation pickup locations based on ETA, price, and/or other information. For instance, the transportation matching system 104 can cause the requestor computing device to display augmented reality elements to indicate that a less expensive transportation pickup location is available nearby (or within the environmental scene). Additionally, the transportation matching system 104 can cause the requestor computing device to display augmented reality elements to indicate that other ride types (e.g., a shared ride) and/or other vehicle types are available at one or more transportation pickup locations. The transportation matching system 104 can cause the requestor computing device to display augmented reality elements to guide the requestor to other transportation pickup locations that are not within the environmental scene by utilizing one or more methods described in the figures below.

Moreover, the transportation matching system 104 can cause the requestor computing device to display augmented reality elements for offers associated with the transportation (e.g., an offer indicating that a transportation service available at a later time will be less expensive to the requestor). Furthermore, the offers can correspond to augmented reality elements that indicate a location (e.g., a café within the environmental scene, a library, a bus stop, etc.) where the requestor can wait until the later available transportation service. For example, the transportation matching system 104 can cause the requestor computing device to display an augmented reality element at a transportation pickup location within an environmental scene, a price for the transportation pickup location, and an offer that indicates that the transportation pickup location will be less expensive at a later time period (and/or an offer for a product or service at a business corresponding to the pickup location). Indeed, the transportation matching system 104 can utilize any number of matching analyses, comparing methods, and/or algorithms to determine comparisons and/or options for the transportation request for display as augmented reality elements within an environmental scene.

Furthermore, the transportation matching system 104 can identify interactions and/or actions of a requestor with a requestor computing device that displays multiple augmented reality elements for multiple transportation pickup locations and/or options in accordance with one or more embodiments herein. For example, as described above, the transportation matching system 104 can identify gestures of the requestor within an environmental scene that displays the multiple augmented reality elements. For instance, the transportation matching system 104 can identify a hand of the requestor, within the environmental scene, pointing at one augmented reality element corresponding to a first transportation pickup location amongst the multiple augmented reality elements, each corresponding to a transportation pickup location. Indeed, the transportation matching system 104 can identify such an interaction as a selection of the first transportation pickup location. Moreover, the transportation matching system 104 can identify voice commands via the requestor computing device from the requestor for selections between the multiple transportation pickup locations. Additionally, the transportation matching system 104 can also identify that the requestor is moving towards one of the determined transportation pickup locations from the multiple transportation pickup locations using methods described in greater detail in FIG. 8. Indeed, as described in one or more embodiments herein, the transportation matching system 104 can send a transportation request to a transportation provider (corresponding to the selected transportation pickup location) based on the interactions and/or the actions of the requestor with the requestor computing device.

Figure 7:
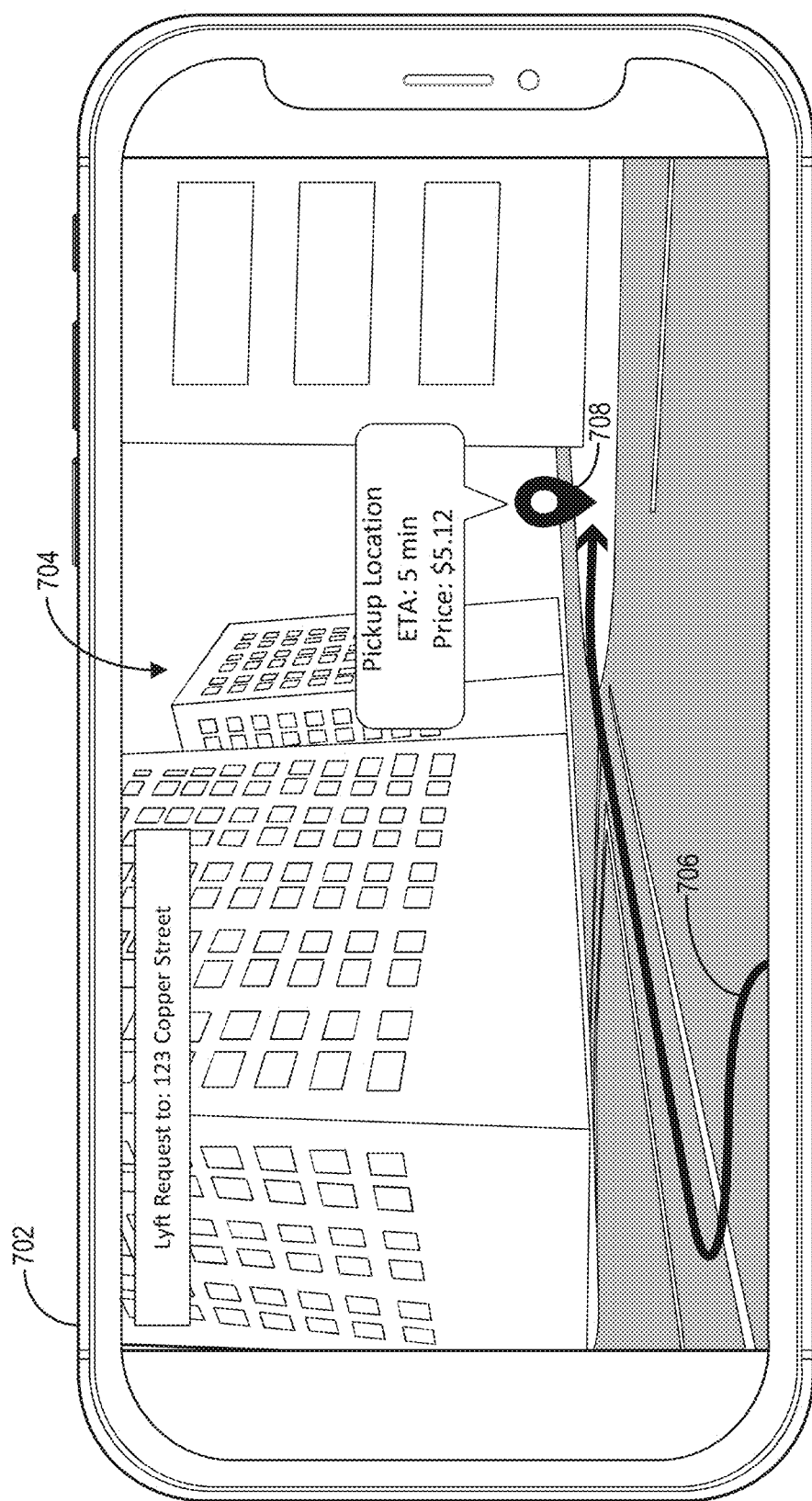
FIG. 7 illustrates the transportation matching system displaying an augmented reality directional element within an environmental scene in accordance with one or more embodiments.

As mentioned above, the transportation matching system 104 can provide, for display on a requestor computing device, an augmented reality element (or augmented reality directional element) that displays a path to a transportation pickup location within an environmental scene. For instance, FIG. 7 illustrates the transportation matching system 104 causing a requestor computing device to display an augmented reality element that indicates a path to a transportation pickup location within an environmental scene from the current location of the requestor computing device (or requestor). In particular, as shown in FIG. 7, the transportation matching system 104 can cause the requestor computing device 702 to display an augmented reality element 706 (e.g., a guided path) to a determined transportation pickup location indicated by an augmented reality element 708 within the environmental scene 704. Indeed, the augmented reality element 706 (e.g., a guided path) can assist a requestor to travel to the determined transportation pickup location (e.g., the location indicated by the augmented reality element 708).

In one or more embodiments, the transportation matching system 104 displays (or provides) an augmented reality element to display a path to the transportation pickup location by utilizing information such as, but not limited to, the current location of the requestor computing device and/or the location of the transportation pickup location. For example, the transportation matching system 104 can determine a path between the current location of the requestor computing device and the location of the transportation pickup location (within the three-dimensional representation generated from the one or more environmental digital images as described above). Then, the transportation matching system 104 can cause the requestor computing device to display one or more augmented reality elements (e.g., an arrow and/or a line) along the determined path within an environmental scene which includes the path location. In one or more embodiments, the transportation matching system 104 can cause requestor computing device to update and/or change the displayed one or more augmented reality elements that represent the path to reflect changes in the current position of the requestor computing device (e.g., movement of the requestor) and/or changes in the position of the camera of the requestor computing device.

Moreover, the transportation matching system 104 can cause the requestor computing device to display one or more augmented reality elements to indicate multiple paths when there are multiple transportation pickup locations (in accordance with one or more embodiments herein). For example, the transportation matching system 104 can cause the requestor computing device to display, via augmented reality elements, separate paths within an environmental scene to each transportation pickup location. In some embodiments, the transportation matching system 104 can cause the requestor computing device to distinguish the augmented reality elements for each path by utilizing labels and/or visual changes to each of the augmented reality elements (e.g., different colors for each path).

Also, the transportation matching system 104 can cause the requestor computing device to display one or more augmented reality elements to indicate paths to transportation pickup locations that are not within a current environmental scene of the requestor computing device (e.g., not within the view of the camera of the requestor computing device). For example, the transportation matching system 104 can cause the requestor computing device to display one or more augmented reality elements that indicate a path to a transportation pickup location. For instance, the transportation matching system 104 can cause the requestor computing device to display an augmented reality element such as an arrow that directs the requestor towards a transportation pickup location, that is nearby, but not in the environmental scene, because of obstructions due to objects (e.g., buildings) and/or because the transportation pickup location is located outside of the viewpoint of the requestor computing device and/or the requestor (e.g., a transportation pickup location located behind the requestor).

In one or more embodiments, the transportation matching system 104 (or requestor computing device) can create (or display) a variety of augmented reality elements to indicate a path. For instance, the augmented reality elements that indicate a path can include an arrow pointing towards the transportation pickup location within the environmental scene and/or a line tracing the path within an environmental scene. Additionally, the transportation matching system 104 can cause the requestor computing device to display one or more augmented reality elements within the environmental scene corresponding to information associated with the determined path and/or guidance to the transportation pickup location. For instance, the transportation matching system 104 can cause the requestor computing device to display one or more augmented reality elements, within the environmental scene, for information such as, but not limited to, a distance value between the current location and the transportation pickup location and/or a time to travel to the transportation pickup location. In addition, the transportation matching system 104 can also cause the requestor computing device to provide information corresponding to the determined path and/or guidance to the transportation pickup location via audio prompts and/or graphical user interface prompts.

Furthermore, the transportation matching system 104 can also cause the requestor computing device to display one or more augmented reality elements within the environmental scene that correspond to objects and/or obstacles within the environmental scene. For example, the transportation matching system 104 can utilize one or more image recognition methods to identify one or more objects and/or obstacles (e.g., traffic signs, street signs, street lights, curbs, no parking areas, fire hydrants, bus stops, etc.) as described above. In addition, the transportation matching system 104 can cause the requestor computing device to display one or more augmented reality elements at the identified objects and/or obstacles within an environmental scene to provide the requestor with additional information corresponding to guidance to the transportation pickup location. For instance, the transportation matching system 104 can cause the requestor computing device to display an augmented reality element at a location recognized as a no stopping area within the environmental scene to indicate to the requestor that a transportation provider will be unable to stop at the location indicated by the augmented reality element.

Although FIG. 7 illustrates (or describes) one or more embodiments of the transportation matching system 104 within a mobile device, the transportation matching system 104 can similarly display augmented reality elements indicating a path and/or obstacle within an augmented reality wearable device (e.g., as described in FIG. 5B) in accordance with one or more embodiments herein.

Figure 8:
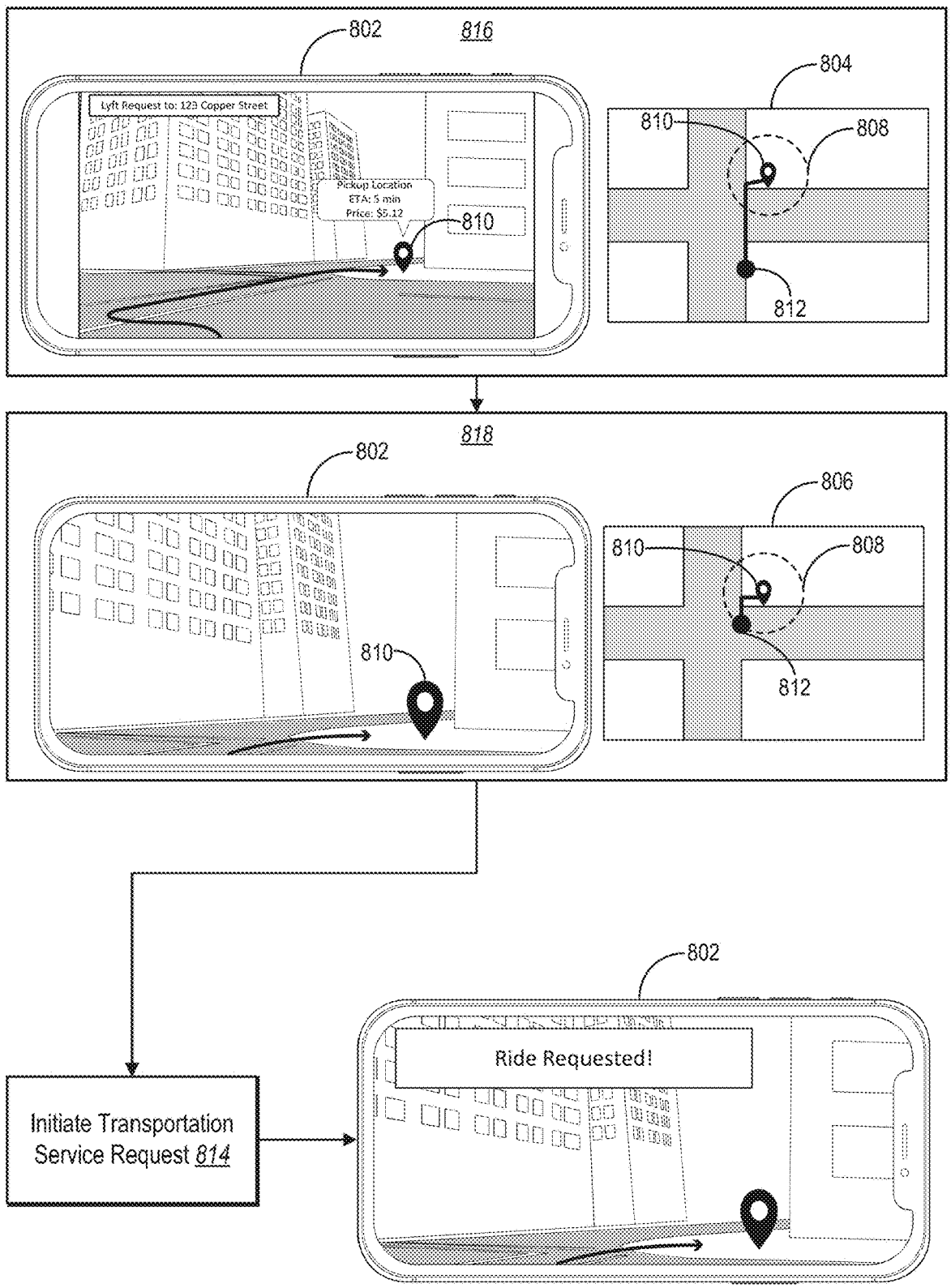
FIG. 8 illustrates a flowchart of the transportation matching system utilizing location tracking of a requestor computing device to send a transportation request to a transportation provider in accordance with one or more embodiments.

As mentioned above, the transportation matching system 104 can send a transportation request to a transportation provider upon detecting (or identifying) that a requestor is moving towards a determined transportation pickup location. For instance, FIG. 8 illustrates an example embodiment in which the transportation matching system 104 sends a transportation request to a transportation provider upon identifying that a requestor (or requestor computing device) is near a determined transportation pickup location (e.g., a transportation pickup location displayed as an augmented reality element within an environmental scene). For instance, as shown in FIG. 8, the transportation matching system 104 can cause a requestor computing device 802 to display an augmented reality element for a transportation pickup location 810 and a path to the transportation pickup location from the current location of the requestor computing device 802. Indeed, as shown in FIG. 8, the transportation matching system 104 can determine the current location of the requestor computing device 802 and track the movement of the requestor computing device 802 to detect that the requestor is moving towards a determined transportation pickup location (e.g., the transportation pickup location 810).

Furthermore, as shown in FIG. 8, the transportation matching system 104 can track the current location 812 of the requestor computing device 802 in relation to a threshold proximity 808 of the transportation pickup location 810 in tracking map 804 (e.g., a tracking feature that is not displayed to the requestor) in act 816. Moreover, as the current location 812 of the requestor computing device 802 changes (or updates), the transportation matching system 104 can update the tracking information of the requestor computing device to detect whether the requestor computing device is moving towards the transportation pickup location 810. For instance, as shown in FIG. 8, when the requestor computing device 802 moves towards the transportation pickup location 810 in act 818, the transportation matching system 104 can determine an updated tracking map 806 in which the current location 812 of the requestor computing device 802 is within the threshold proximity 808 of the transportation pickup location 810. Although FIG. 8 illustrates the transportation matching system 104 utilizing a tracking map, the transportation matching system 104 can utilize a variety of methods to keep track of a requestor computing device in relation to a transportation pickup location such as, but not limited to, a log of tracked location data.

Indeed, as shown in FIG. 8, upon detecting that the current location 812 of the requestor computing device 802 is within the threshold proximity 808, the transportation matching system 104 can send a transportation request to a transportation provider in act 814 in accordance with one or more embodiments herein. Furthermore, upon sending the transportation request to a transportation provider in act 814, the transportation matching system 104 can cause the requestor computing device 802 to display an augmented reality element (and/or a graphical user interface element) to indicate that a transportation request has been sent. For instance, as shown in FIG. 8, the transportation matching system 104 causes the requestor computing device to display the augmented reality element indicating "Ride Requested!"

In one or more embodiments, the transportation matching system 104 configures the threshold proximity utilized to identify if a requestor computing device is moving towards a transportation pickup location. In particular, the threshold proximity can include any number of shapes, ranges, and/or sizes to create a zone around a transportation pickup location. Furthermore, the transportation matching system 104 can customize the threshold proximity based on, but not limited to, a requestor transportation request history, the number of transportation providers available, the number of transportation requests within the region where the transportation pickup location is located, and/or preferences received from the requestor.

Furthermore, as shown in FIG. 8, the transportation matching system 104 can cause the requestor computing device 802 to display one or more augmented reality elements to indicate a path from the current location of the requestor computing device 802 to the transportation pickup location 810. Indeed, the transportation matching system 104 can cause the requestor computing device 802 to display one or more augmented reality elements to indicate a path as described above in FIG. 7. In some embodiments, the transportation matching system 104 can detect that a requestor computing device is moving towards a transportation pickup location (and/or send a transportation request) in accordance with one or more embodiments herein without displaying a path as an augmented reality element within the environmental scene of the requestor computing device. Furthermore, the transportation matching system 104 can provide multiple transportation pickup locations, as described above, and detect movement of the requestor computing device towards any of the transportation pickup locations in accordance with one or more embodiments herein.

Additionally, in one or more embodiments, the transportation matching system 104 can track the location of a requestor computing device. For instance, in one or more embodiments, the transportation matching system 104 utilizes a dead reckoning method to track the location of a requestor computing device. In particular, the transportation matching system 104 can identify an initial location of the requestor computing device (based on an environmental digital image provided from the requestor computing device, as described above) and then use dead reckoning approaches to track the relative movement of the requestor computing device from the initial location. For example, the transportation matching system 104 can identify local movement information (e.g., information corresponding to movement) from the requestor device (e.g., a step counter, IMU, accelerometer, changes in GPS on the requestor device, and/or changes in other signals such as, but not limited to, Bluetooth and WiFi) to advance the position of the requestor computing device from the previously determined location of the requestor computing device, determined from the environmental digital image. As an example, the transportation matching system 104 can determine, utilizing movement of the requestor computing device, that a requestor is moving ten meters north from the determined initial location of the requestor computing device and advance the location (or position) of the requestor computing device ten meters north from the determined initial location.

In one or more embodiments, the transportation matching system 104 can utilize WiFi proximity to track updates in the location of the requestor computing device. For instance, the transportation matching system 104 can identify nearby WiFi access points, on the requestor computing device, and track the proximity of the requestor computing device to the identified nearby WiFi access points (e.g., utilizing triangulation) to update and/or track the location of the requestor computing device in relation to a transportation pickup location. Similarly, the transportation matching system 104 can include sensors within the environment that the requestor is positioned (e.g., RFID chips, Bluetooth sensors, NFC tags, etc.). Indeed, the transportation matching system 104 can include such sensors within physical objects in the environment such as, but not limited to, street signs, sidewalks, buildings, posts, and/or street lights. For example, the transportation matching system 104 can identify such nearby sensor, on the requestor computing device, and track the proximity of the requestor computing device to such nearby sensors. Moreover, the transportation matching system 104 can utilize such sensors to update and/or track the location of the requestor computing device in relation to the transportation pickup location.

Additionally, in some embodiments, the transportation matching system 104 can utilize the environmental digital image stream captured on the requestor computing device to update and/or track the location of the requestor computing device. For example, the transportation matching system 104 can analyze updated environmental digital images from the environmental digital image stream to update the current location of the requestor computing device. In some embodiments, the transportation matching system 104 can utilize the environmental digital image stream to track whether the requestor computing device is following an augmented reality element indicating a path between the requestor computing device and the transportation pickup location to update and/or track the location of the requestor computing device in relation to the transportation pickup location.

Moreover, as mentioned above, the transportation matching system 104 can send a transportation request to a transportation provider upon determining that the requestor computing device is within a threshold proximity of the transportation pickup location. Indeed, the transportation matching system 104 can send the transportation request to the transportation provider as described in one or more embodiments above. Furthermore, the transportation matching system 104 can cause the requestor computing device to display one or more augmented reality elements and/or graphical user interface elements corresponding to information for the sent transportation request. Indeed, the information can include, but is not limited to, transportation provider information, the time of arrival for the transportation provider, and/or the distance of the transportation provider from the transportation pickup location.

Furthermore, in some embodiments, the transportation matching system 104 sends the transportation request to a transportation provider upon detecting that the requestor computing device is moving towards the transportation pickup location. For instance, the transportation matching system 104 can send the transportation request to the transportation provider immediately upon detecting a movement, from the requestor computing device, towards the transportation pickup location. In particular, in some embodiments, the transportation matching system 104 utilizes a greater diameter in the threshold proximity to send the transportation request to the transportation provider earlier. Additionally, in one or more embodiments, the transportation matching system 104 can send the transportation request to the transportation provider upon detecting that the requestor computing device is following the path displayed as an augmented reality element within the environmental scene on the requestor computing device. Moreover, the transportation matching system 104 can send the transportation request to the transportation provider based on other interactions from the requestor with the requestor computing device as described in one or more figures above.

Additionally, the transportation matching system 104 can cancel (or terminate) the transportation request based on the tracked location of the requestor computing device. For example, the transportation matching system 104 can cancel the transportation request if the requestor computing device, via tracked location information, is not within a threshold proximity of the transportation pickup location during a threshold cancellation time period. Indeed, in one or more embodiments, the transportation matching system 104 causes the requestor computing device to display, as an augmented reality element and/or as a graphical user interface element, the threshold cancellation time period (e.g., a countdown timer) within the environmental scene.

Furthermore, although FIG. 8 illustrates (or describes) one or more embodiments of the transportation matching system 104 within a mobile device, the transportation matching system 104 can similarly track the location of an augmented reality wearable device (e.g., as described in FIG. 5B) to send a transportation request to a transportation provider in accordance with one or more embodiments herein.

Figure 9:
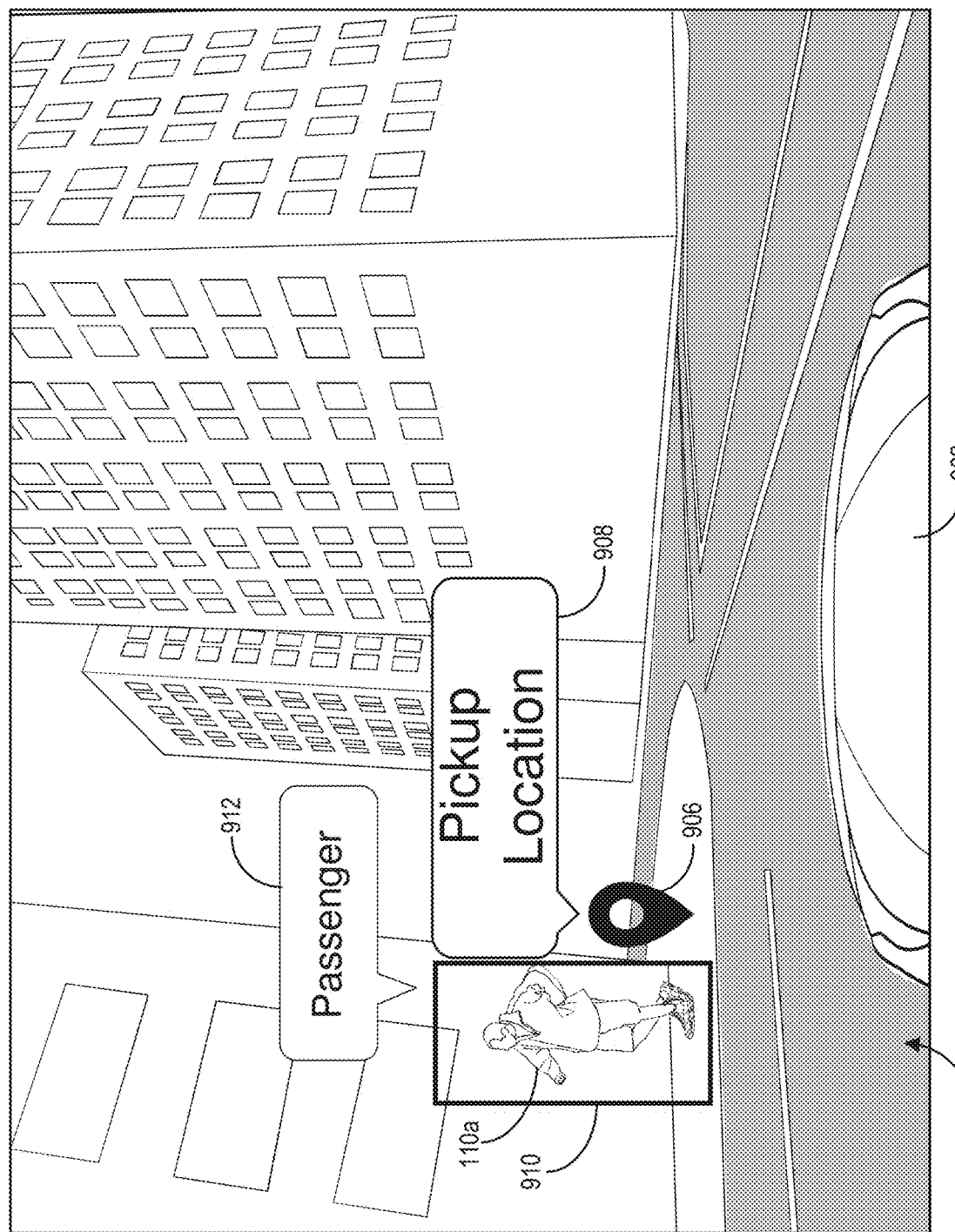
FIG. 9 illustrates the transportation matching system displaying an augmented reality element within an environmental scene on a transportation provider computing device in accordance with one or more embodiments.

Furthermore, the transportation matching system 104 can cause a transportation provider computing device (e.g., a transportation provider computing device 112) to display one or more augmented reality elements within an environmental scene. For example, FIG. 9 illustrates the transportation matching system 104 causing a transportation provider computing device to display one or more augmented reality elements based on information determined by the transportation matching system 104. For example, the transportation matching system 104 can utilize information such as, but not limited to, the transportation pickup location data, requestor computing device location data, and/or requestor profile data to cause a transportation provider computing device to display one or more augmented reality elements within an environmental scene that corresponds to such information.

In one or more embodiments, the transportation provider computing device includes a mobile device of the transportation provider, a vehicle computing system with a dashboard display, an augmented reality enabled windshield, and/or an augmented reality wearable device for the transportation provider. Indeed, the transportation provider computing device can capture a digital image stream and/or display augmented reality elements within an environmental scene as described above in one or more figures for the requestor computing devices. Furthermore, the transportation matching system 104 can receive and analyze environmental digital images from the transportation provider computing device as described above in one or more figures for the requestor computing devices. For example, the transportation matching system 104 can receive environmental digital images from the transportation provider computing device and determine a location of the transportation provider computing device based on the environmental digital images in accordance with one or more embodiments described herein.

Additionally, the transportation matching system 104 can cause the transportation provider computing device to display one or more augmented reality elements (and/or graphical user interface elements) in accordance with one or more embodiments described herein. For instance, the transportation matching system 104 can cause the transportation provider computing device to display an augmented reality element at a transportation pickup location within an environmental scene that includes the transportation pickup location. Additionally, the transportation matching system 104 can cause the transportation provider computing device to display one or more augmented reality elements for information corresponding to a requestor (e.g., the identity of a requestor). Moreover, the transportation matching system 104 can also cause the transportation provider computing device to display one or more augmented reality elements to display a path (or directions) to a transportation pickup location (in accordance with one or more embodiments described herein) and/or to a destination location.

For example, FIG. 9 illustrates the transportation matching system 104 causing a transportation provider computing device (e.g., an augmented reality enabled windshield 902 of a vehicle) to display one or more augmented reality elements. For instance, as shown in FIG. 9, the transportation matching system 104 causes the augmented reality enabled windshield 902 to display an augmented reality element 906 and information 908 (e.g., "Pickup Location") at the transportation pickup location within an environmental scene 904. Additionally, as shown in FIG. 9, the transportation matching system 104 causes the augmented reality enabled windshield 902 to display information 912 (e.g., "Passenger") as an augmented reality element at the location of a requestor computing device. Furthermore, the transportation matching system 104 can cause the augmented reality enabled windshield 902 to display an augmented reality element 910 to indicate the location of a requestor 110a (e.g., based on image recognition and/or the location of the requestor computing device). Although FIG. 9 illustrates the transportation matching system 104 utilizing an augmented reality enabled windshield, the transportation matching system 104 can utilize any other transportation provider computing device (e.g., an augmented reality wearable device for a transportation provider) to enable one or more embodiments described herein on the transportation provider computing device.

Figure 10:
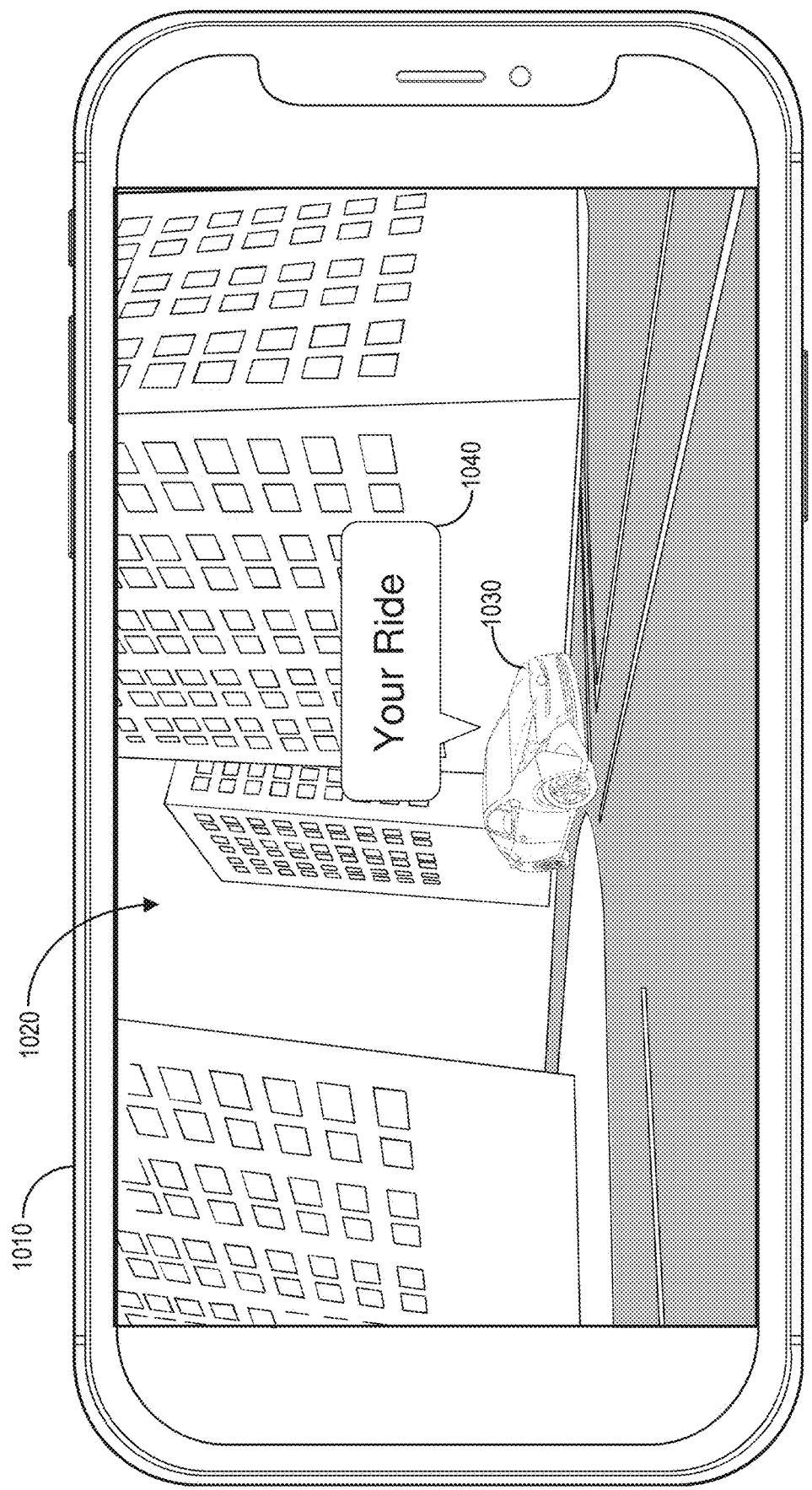
FIG. 10 illustrates the transportation matching system displaying an augmented reality element indicating a transportation provider within an environmental scene in accordance with one or more embodiments.

Additionally, the transportation matching system 104 can cause the requestor computing device to display augmented reality elements to identify a transportation provider during an initialized transportation request. For example, FIG. 10 illustrates the transportation matching system 104 causing the requestor computing device to display an augmented reality element at the location of a transportation provider vehicle within an environmental scene that includes the transportation provider vehicle. For instance, as shown in FIG. 10, the transportation matching system 104 can cause the requestor computing device 1010 to display an augmented reality element 1040 (e.g., a label stating "Your Ride") at the location of a transportation provider vehicle 1030 within the environmental scene 1020 that includes the transportation provider vehicle 1030 (e.g., based on image recognition of the and/or the location of the transportation provider computing device). In some embodiments, the transportation matching system 104 can cause the requestor computing device to display an augmented reality element (e.g., an arrow and/or pointer), within an environmental scene, that indicates (or points to) which direction the transportation provider computing device (or transportation provider) is located regardless of whether the transportation provider is located within the environmental scene or not located within the environmental scene.

Furthermore, although FIG. 10 illustrates (or describes) one or more embodiments of the transportation matching system 104 within a mobile device, the transportation matching system 104 can similarly display augmented reality elements to indicate (or locate) the transportation provider within an augmented reality wearable device (e.g., as described in FIG. 5B) in accordance with one or more embodiments herein.

Figure 11:
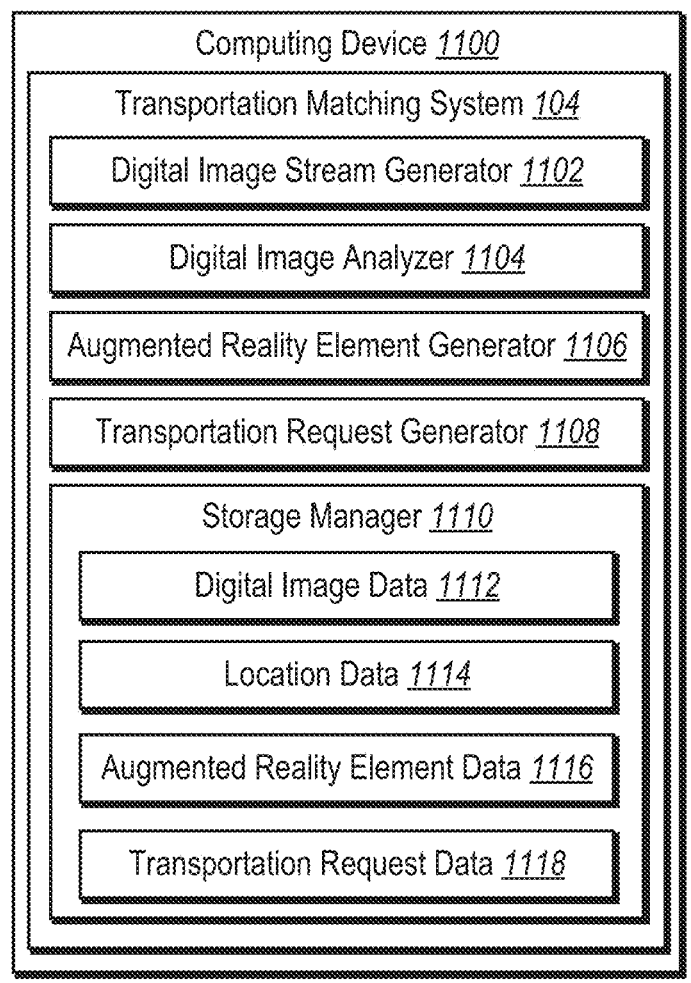
FIG. 11 illustrates a schematic diagram of the transportation matching system in accordance with one or more embodiments.

Turning now to FIG. 11, additional detail will be provided regarding components and capabilities of one or more embodiments of the transportation matching system 104. In particular, FIG. 11 illustrates the transportation matching system 104 executed by a computing device 1100 (e.g., a server and/or client device). As shown in FIG. 11, the computing device 1100 includes, as part of the transportation matching system 104, a digital image stream generator 1102, a digital image analyzer 1104, an augmented reality element generator 1106, a transportation request generator 1108, and a storage manager 1110 which includes digital image data 1112, location data 1114, augmented reality element data 1116, and transportation request data 1118.

As just mentioned, and as illustrated in FIG. 11, the computing device 1100 includes the digital image stream generator 1102. For instance, the digital image stream generator 1102 can receive and/or capture an environmental scene utilizing a camera of a requestor computing device and/or a transportation provider computing device as described in one or more figures above (e.g., FIGS. 3 and 4). Moreover, the digital image stream generator 1102 can provide one or more environmental digital images to determine information such as a requestor computing device location and/or a transportation pickup location as described in one or more figures above (e.g., FIGS. 3 and 4). In addition, the digital image stream generator 1102 can provide, determine, and/or identify context and/or a location for placement of one or more augmented reality elements in an environmental scene as described in one or more figures above (e.g., FIGS. 3-10).

Furthermore, as shown in FIG. 11, the computing device 1100 also includes the digital image analyzer 1104. For example, the digital image analyzer 1104 can analyze one or more environmental digital images to determine, identify, recognize, and/or detect a variety of information including, but not limited to, a requestor computing device location, a transportation pickup location, a path between a requestor computing device location and a transportation pickup location, information regarding an identified transportation provider, information regarding the transportation request, and/or information regarding the completion of the transportation request as described in one or more figures above (e.g., FIG. 4). Additionally, the digital image analyzer 1104 can utilize approaches such as imagery SLAM to determine a variety of information as described in one or more figures above (e.g., FIG. 4).

Moreover, as illustrated in FIG. 11, the computing device 1100 also includes the augmented reality element generator 1106. For instance, the augmented reality element generator 1106 can utilize an environmental digital image stream that is capturing an environmental scene and information such as, but not limited to, a requestor computing device location, a transportation pickup location, a path between a requestor computing device location and a transportation pickup location, information regarding the identified transportation provider, information regarding the transportation request, and/or information regarding the completion of the transportation request generate, create, display, and/or provide one or more augmented reality elements within an environmental scene as described in one or more figures above (e.g., FIGS. 3-10). Furthermore, the augmented reality element generator 1106 can display one or more augmented reality elements within an environmental scene on a variety of computing devices including, but not limited to, a mobile device and/or an augmented reality wearable device as described in one or more figures above (e.g., FIGS. 3-10).

Additionally, as shown in FIG. 11, the computing device 1100 also includes the transportation request generator 1108. For instance, the transportation request generator 1108 can utilize information determined from an environmental digital image to generate, send, and/or dispatch a transportation request to a transportation provider as described in one or more figures above (e.g., FIGS. 4-10). Furthermore, the transportation request generator 1108 can identify interactions with one or more augmented reality elements and/or actions of a requestor utilizing a requestor computing device to generate, send, and/or dispatch a transportation request as described in one or more figures above (e.g., FIGS. 3-10). Furthermore, the transportation request generator 1108 can utilize information such as, but not limited to, a requestor computing device location, information regarding transportation pickup location, information regarding the identified transportation provider, information regarding the transportation request, and/or information regarding the completion of the transportation request to match, identify, determine, and/or dispatch a transportation provider for a transportation request as described in one or more figures above (e.g., FIGS. 4-10).

Furthermore, as illustrated in FIG. 11, the computing device 1100 also includes the storage manager 1110. The storage manager 1110 maintains data to perform the one or more functions of the transportation matching system 104.

As illustrated, the storage manager 1110 includes digital image data 1112 which can include environmental digital image stream data captured from a requestor computing device, environmental digital images provided from the environmental digital image stream, and/or digital image data utilized by one or more image recognition methods as described in one or more figures above (e.g., FIGS. 3 and 4). Furthermore, the storage manager 1110 includes location data 1114 which can include location data for a requestor computing device, location data for a transportation provider computing device, location data for a transportation pickup location, and/or location data for a variety of objects identified in an environmental digital image, environmental digital image stream, and/or an environmental scene as described in one or more figures above (e.g., FIGS. 3-10). Moreover, the storage manager 1110 includes augmented reality element data 1116 which can include digital images, information, and/or positioning information (e.g., information corresponding to where an augmented reality element should be positioned within an environmental scene) for a variety of objects (or information) such as transportation pickup locations, paths, guidance, and/or instructions as described in one or more figures above (e.g., FIGS. 3-10). In addition, the storage manager 1110 includes transportation request data 1118 which can include information such as, but not limited to, a destination location, a pickup location, requestor preferences and a variety of information such as, but not limited to, information regarding transportation pickup location, information regarding the identified transportation provider, information regarding the transportation request, and/or information regarding the completion of the transportation request (e.g., an estimated time of arrival and/or a price) as described in one or more figures above (e.g., FIGS. 3-10).

Each of the components 1102-1118 of the computing device 1100 (e.g., the computing device 1100 implementing the transportation matching system 104), as shown in FIG. 11, may be in communication with one another using any suitable communication technologies. It will be recognized that although components 1102-1118 of the computing device 1100 are shown to be separate in FIG. 11, any of components 1102-1118 may be combined into fewer components, such as into a single facility or module, divided into more components, or configured into different components as may serve a particular embodiment.

The components 1102-1118 of the computing device 1100 can comprise software, hardware, or both. For example, the components 1102-1118 can comprise one or more instructions stored on a computer-readable storage medium and executable by processors of one or more computing devices. When executed by the one or more processors, the computer-executable instructions of the transportation matching system 104 (e.g., via the computing device 1100) can cause a client device and/or a server device to perform the methods described herein. Alternatively, the components 1102-1118 and their corresponding elements can comprise hardware, such as a special purpose processing device to perform a certain function or group of functions. Additionally, the components 1102-1118 can comprise a combination of computer-executable instructions and hardware.

Furthermore, the components 1102-1118 of the transportation matching system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1118 may be implemented as a stand-alone application, such as a desktop or mobile application. Furthermore, the components 1102-1118 may be implemented as one or more web-based applications hosted on a remote server. The components 1102-1118 may also be implemented in a suite of mobile device applications or "apps."

Figure 12:
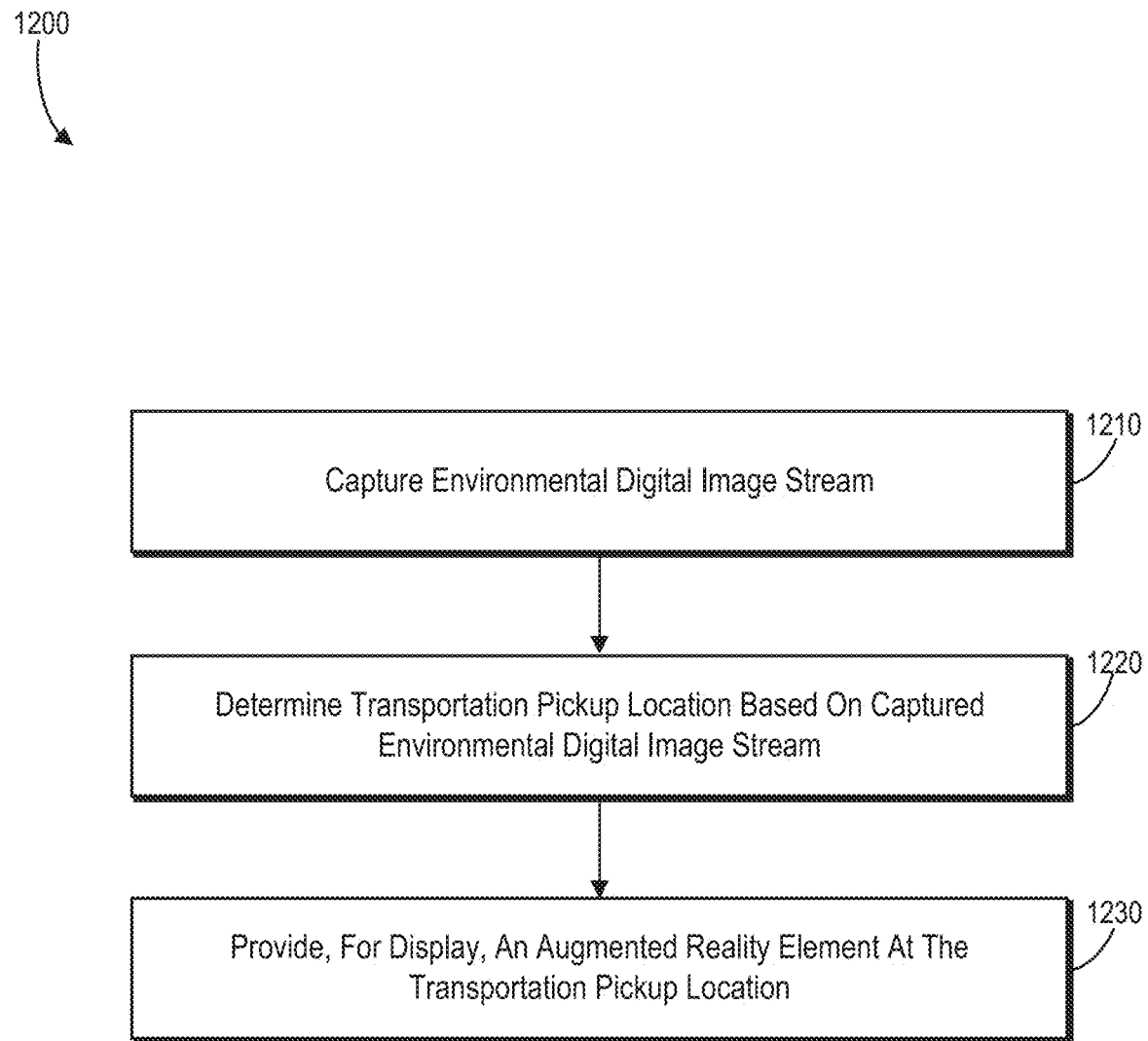
FIG. 12 illustrates a flowchart of a series of acts for providing transportation pickup location information by utilizing an environmental digital image stream in accordance with one or more embodiments.

FIGS. 1-11, the corresponding text, and the examples provide a number of different methods, systems, devices, and non-transitory computer-readable media of transportation matching system 104. In addition to the foregoing, one or more embodiments can also be described in terms of flowcharts comprising acts for accomplishing a particular result, as shown in FIG. 12. FIG. 12 may be performed with more or fewer acts. Further, the acts may be performed in differing orders. Additionally, the acts described herein may be repeated or performed in parallel with one another or parallel with different instances of the same or similar acts.

As mentioned, FIG. 12 illustrates a flowchart of a series of acts 1200 for providing transportation pickup location information by utilizing an environmental digital image stream in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

As illustrated in FIG. 12, the series of acts 1200 includes an act 1210 of capturing an environmental digital image stream. In particular, the act 1210 can include, capturing an environmental digital image stream utilizing a camera of a requestor computing device to initiate a transportation request. Furthermore, the act 1210 can include, in response to identifying an indication to initiate a transportation request at a requestor computing device, capturing an environmental digital image stream utilizing a camera of the requestor computing device. Moreover, the act 1210 can also include, in response to identifying an indication to initiate the transportation request at the requestor computing device, displaying the environmental digital image stream on the requestor computing device. Furthermore, the act 1210 can include providing an environmental digital image from the environmental digital image stream to a remote server. For instance, the requestor computing device can include a mobile device. Additionally, the act 1210 can include, in response to identifying the indication to initiate the transportation request at the mobile device, displaying the environmental digital image stream on the mobile device. Moreover, the requestor computing device can include an augmented reality wearable device.

As illustrated in FIG. 12, the series of acts 1200 includes an act 1220 of determining a transportation pickup location based on a captured environmental digital image stream. In particular, the act 1220 can include determining a location of the camera based on the captured environmental digital image stream. Furthermore, the act 1220 can include determining at least one transportation pickup location based at least in part on the location of the camera. Furthermore, the act 1220 can include, determining the at least one transportation pickup location by identifying one or more locations of one or more transportation providers, determining a matched transportation provider from the one or more transportation providers, and selecting the at least one transportation pickup location based on a location of the matched transportation provider and the location of the camera.

Moreover, the act 1220 can include, in response to providing the environmental digital image, receiving a transportation pickup location from the remote server based on the environmental digital image. Furthermore, the act 1220 can include, in response to providing the environmental digital image to the remote server, receiving a second transportation pickup location from the remote server based on the environmental digital image. Additionally, the act 1220 can include determining a second transportation pickup location based on the environmental digital image stream. Moreover, the act 1220 can include, in response to providing the environmental digital image, receiving an initial requestor computing device location from the remote server based on the environmental digital image.

As illustrated in FIG. 12, the series of acts 1200 includes an act 1230 of providing, for display, an augmented reality element at the transportation pickup location. In particular, the act 1230 can include, providing, for display on the requestor computing device, an augmented reality element at the at least one transportation pickup location within an environmental scene. For example, the augmented reality element can include pickup information associated with each of the at least one transportation pickup location. Moreover, the pickup information can include an estimated time of arrival and a cost associated with the transportation request (e.g., from each of the at least one transportation pickup location). In addition, the act 1230 can include providing, for display on the requestor computing device, a second augmented reality element at the second transportation pickup location within the environmental scene (and/or the augmented reality element at the at least one transportation pickup location within the environmental scene). Moreover, the act 1230 can include displaying, on the requestor computing device, the second augmented reality element at the second transportation pickup location within the environmental scene. Additionally, the act 1230 can include generating the augmented reality element based on comparing information associated with the at least one transportation pickup location and information associated with a second transportation pickup location.

Furthermore, the act 1230 can include providing, for display, on the requestor computing device, an augmented reality directional element indicating a path to the at least one transportation pickup location within the environmental scene. Moreover, the act 1230 can include determining an updated requestor computing device location based on information associated with the requestor computing device and the initial requestor computing device location. Additionally, the act 1230 can include, upon determining that the updated requestor computing device is within a threshold proximity to the at least one transportation pickup location, sending the transportation request to a transportation provider.

Moreover, the act 1230 can include identifying an initial requestor computing device location based on the environmental digital image stream. Furthermore, the act 1230 can include determining an updated requestor computing device location based on local movement information associated with the requestor computing device and the initial requestor computing device location. Additionally, the act 1230 can include, in response to determining that the updated requestor computing device location is within a threshold proximity to the at least one transportation pickup location, sending the transportation request to a transportation provider.

In addition, the augmented reality element at the at least one transportation pickup location within the environmental scene can include a selectable element. Furthermore, the act 1230 can include receiving an indication of an interaction with the selectable element. Moreover, the act 1230 can include, based on the indication of an interaction with the selectable element, sending the transportation request, corresponding to the at least one transportation pickup location, to a transportation provider.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa).

For example, computer-executable instructions or data structures received over a network or data link can be buffered in RAM within a network interface module (e.g., a "NIC"), and then eventually transferred to computer system RANI and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
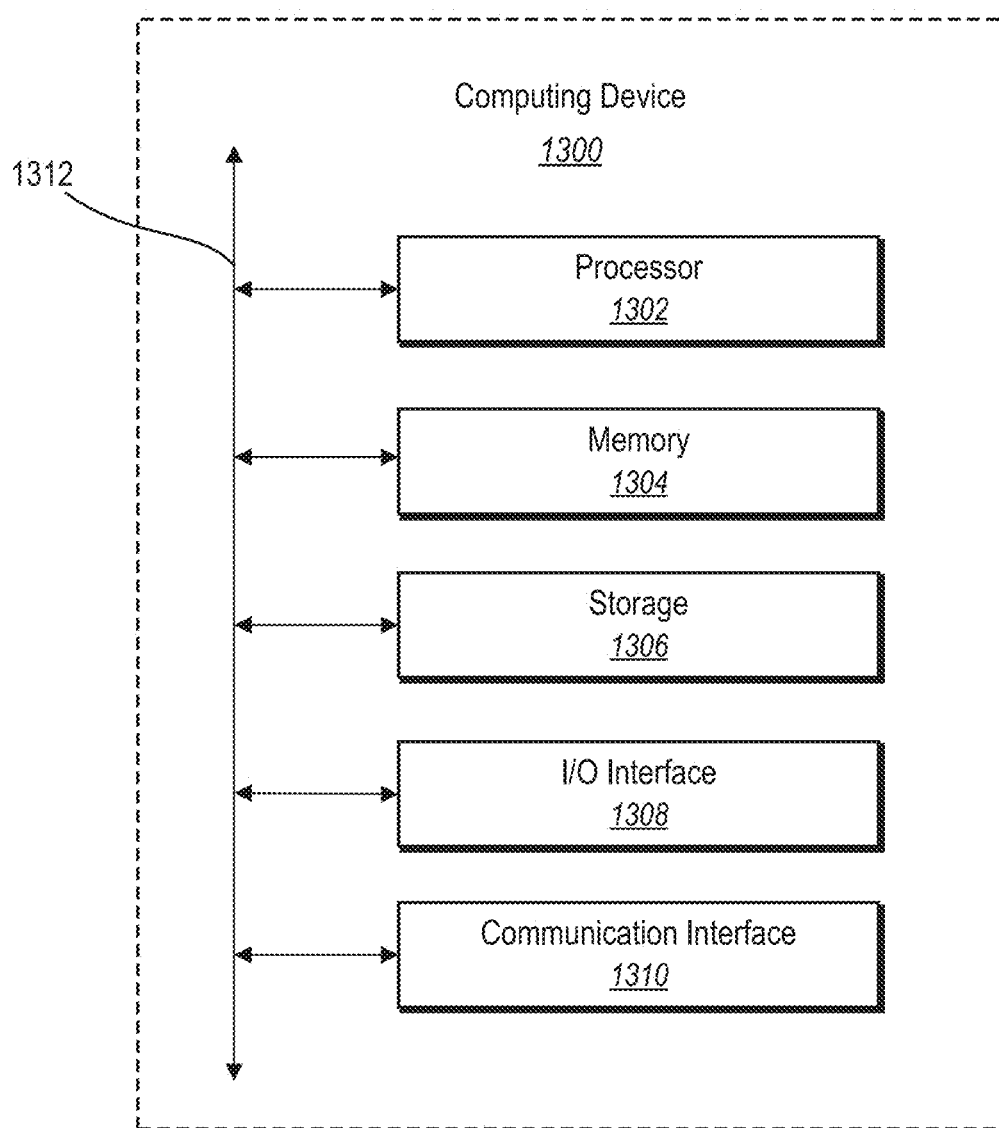
FIG. 13 illustrates a block diagram of an example computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., computing device 1100, server device(s) 102, requestor computing devices 108, and transportation provider computing device 112). In one or more embodiments, the computing device 1300 may be a mobile device (e.g., a mobile telephone, a smartphone, a PDA, a tablet, a laptop, a camera, a tracker, a watch, a wearable device, an augmented reality wearable device, an augmented reality display device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

Figure 14:
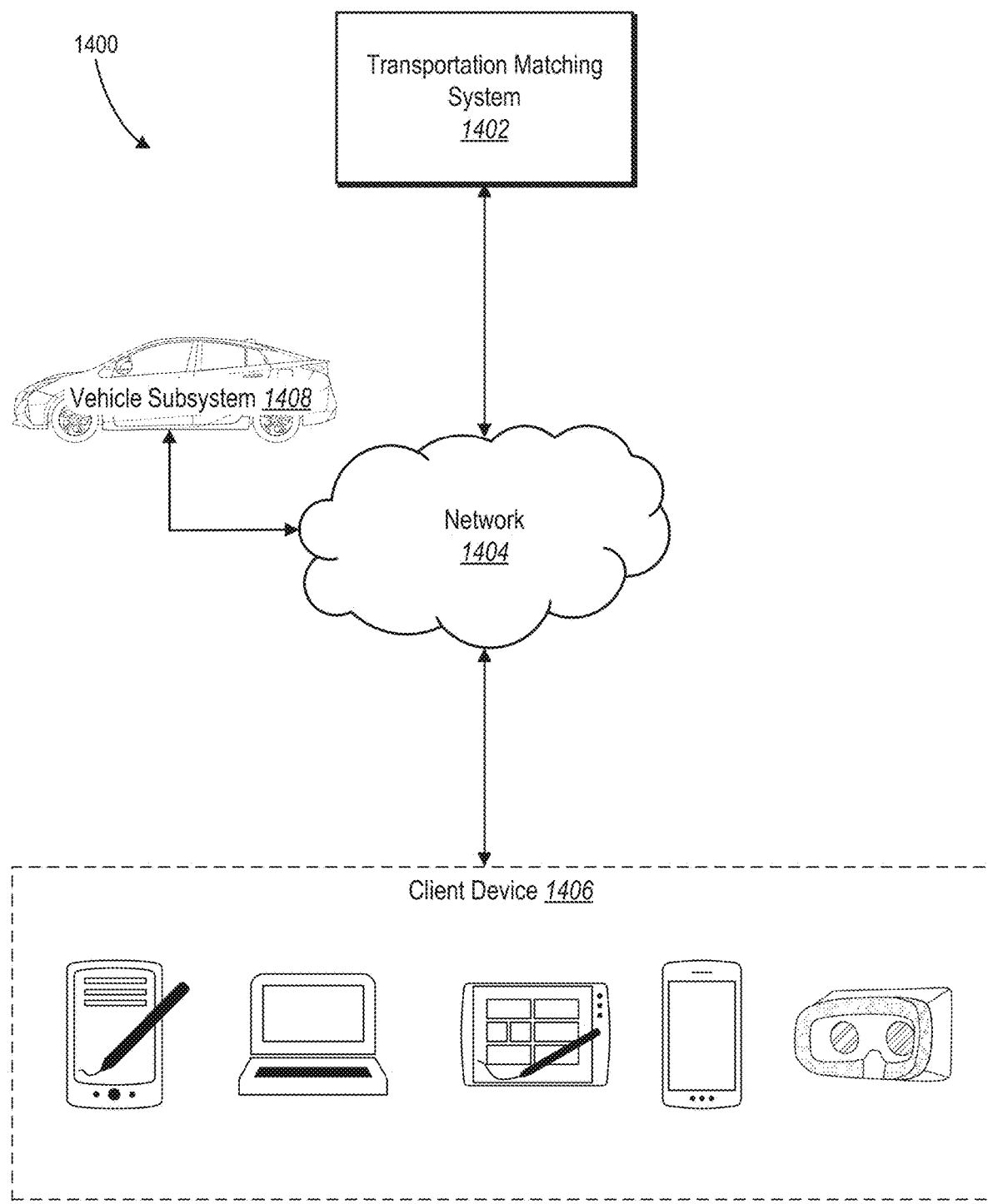
FIG. 14 illustrates an example network environment of a transportation matching system in accordance with one or more embodiments.

FIG. 14 illustrates an example network environment 1400 of a transportation matching system (e.g., the transportation matching system 104). The network environment 1400 includes a client device 1406, a transportation matching system 1402, and a vehicle subsystem 1408 connected to each other by a network 1404. Although FIG. 14 illustrates a particular arrangement of the client device 1406, the transportation matching system 1402, the vehicle subsystem 1408, and the network 1404, this disclosure contemplates any suitable arrangement of the client device 1406, the transportation matching system 1402, the vehicle subsystem 1408, and the network 1404. As an example, and not by way of limitation, two or more of the client device 1406, the transportation matching system 1402, and the vehicle subsystem 1408 communicate directly, bypassing the network 1404. As another example, two or more of the client device 1406, the transportation matching system 1402, and the vehicle subsystem 1408 may be physically or logically co-located with each other in whole or in part. Moreover, although FIG. 14 illustrates a particular number of the client devices 1406, the transportation matching systems 1402, the vehicle subsystems 1408, and the networks 1404, this disclosure contemplates any suitable number of the client devices 1406, the transportation matching systems 1402, the vehicle subsystems 1408, and the networks 1404. As an example, and not by way of limitation, the network environment 1400 may include multiple client devices 1406, the transportation matching systems 1402, the vehicle subsystems 1408, and the networks 1404.

This disclosure contemplates any suitable network 1404. As an example, and not by way of limitation, one or more portions of the network 1404 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1404 may include one or more networks 1404.

Links may connect the client device 1406, the transportation matching system 1402, and the vehicle subsystem 1408 to the communication network 1404 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1400. One or more first links may differ in one or more respects from one or more second links.

In particular embodiments, the client device 1406 may be an electronic device including hardware, software, or embedded logic components or a combination of two or more such components and capable of carrying out the appropriate functionalities implemented or supported by the client device 1406. As an example, and not by way of limitation, a client device 1406 may include any of the computing devices discussed above in relation to FIG. 13. A client device 1406 may enable a network user at the client device 1406 to access a network. A client device 1406 may enable its user to communicate with other users at other client systems 1406.

In particular embodiments, the client device 1406 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1406 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1406 one or more Hyper Text Markup Language (HTML) files responsive to the HTTP request. The client device 1406 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1402 may be a network-addressable computing system that can host a ride share transportation network. The transportation matching system 1402 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 1402.

In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 1402 may manage ride matching services to connect a user/requester with a vehicle and/or provider. By managing the ride matching services, the transportation matching system 1402 can manage the distribution and allocation of vehicle subsystem resources and user resources such as GPS location and availability indicators, as described herein.

The transportation matching system 1402 may be accessed by the other components of the network environment 1400 either directly or via network 1404. In particular embodiments, the transportation matching system 1402 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1402 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1406, or a transportation matching system 1402 to manage, retrieve, modify, add, or delete, the information stored in data store.

In particular embodiments, the transportation matching system 1402 may provide users with the ability to take actions on various types of items or objects, supported by the transportation matching system 1402. As an example, and not by way of limitation, the items and objects may include ride share networks to which users of the transportation matching system 1402 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1402 or by an external system of a third-party system, which is separate from the transportation matching system 1402 and coupled to the transportation matching system 1402 via a network 1404.

In particular embodiments, the transportation matching system 1402 may be capable of linking a variety of entities. As an example, and not by way of limitation, the transportation matching system 1402 may enable users to interact with each other or other entities, or to allow users to interact with these entities through an application programming interfaces (API) or other communication channels.

In particular embodiments, the transportation matching system 1402 may include a variety of servers, sub-systems, programs, modules, logs, and data stores. In particular embodiments, the transportation matching system 1402 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1402 may also include suitable components such as network interfaces, security mechanisms, load balancers, failover servers, management-and-network-operations consoles, other suitable components, or any suitable combination thereof. In particular embodiments, the transportation matching system 1402 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1402 and one or more client systems 1406. An action logger may be used to receive communications from a web server about a user's actions on or off the transportation matching system 1402. In conjunction with the action log, a third-party-content-object log may be maintained of user exposures to third-party-content objects. A notification controller may provide information regarding content objects to a client device 1406. Information may be pushed to a client device 1406 as notifications, or information may be pulled from the client device 1406 responsive to a request received from the client device 1406. Authorization servers may be used to enforce one or more privacy settings of the users of the transportation matching system 1402. A privacy setting of a user determines how particular information associated with a user can be shared. The authorization server may allow users to opt in to or opt out of having their actions logged by the transportation matching system 1402 or shared with other systems, such as, for example, by setting appropriate privacy settings. Third-party-content-object stores may be used to store content objects received from third parties. Location stores may be used for storing location information received from the client systems 1406 associated with users.

In addition, the vehicle subsystem 1408 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1408 can include an autonomous vehicle—i.e., a vehicle that does not require a human operator. In these embodiments, the vehicle subsystem 1408 can perform maneuvers, communicate, and otherwise function without the aid of a human provider, in accordance with available technology.

In particular embodiments, the vehicle subsystem 1408 may include one or more sensors incorporated therein or associated thereto. For example, sensor(s) can be mounted on the top of the vehicle subsystem 1408 or else can be located within the interior of the vehicle subsystem 1408. In certain embodiments, the sensor(s) can be located in multiple areas at once—i.e., split up throughout the vehicle subsystem 1408 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1408 may include a communication device capable of communicating with the client device 1406 and/or the transportation matching system 1402. For example, the vehicle subsystem 1408 can include an on-board computing device communicatively linked to the network 1404 to transmit and receive data such as GPS location information, sensor-related information, requester location information, or other relevant information.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   capturing an environmental digital image stream utilizing a camera of a requestor computing device;
   determining, utilizing the environmental digital image stream and a location of the requestor computing device, a first transportation pickup location and a second transportation pickup location for the requestor computing device;
   providing, for display via the requestor computing device, a first augmented reality element, overlayed within the environmental digital image stream, in relation to the first transportation pickup location and a second augmented reality element, overlayed within the environmental digital image stream, in relation to the second transportation pickup location; and
   in response to detecting a user action via the requestor computing device, selecting the first transportation pickup location for the requestor computing device and a matched provider computing device.

2. The computer-implemented method of claim 1, further comprising determining the first transportation pickup location and the second transportation pickup location for the requestor computing device based on a transportation request transmitted by the requestor computing device.

3. The computer-implemented method of claim 1, wherein providing the first augmented reality element comprises providing, for display via the requestor computing device, a first estimated time of arrival or a first transportation value corresponding to the first transportation pickup location in relation to the first augmented reality element.

4. The computer-implemented method of claim 3, wherein providing the second augmented reality element comprises providing, for display via the requestor computing device, a second estimated time of arrival or a second transportation value corresponding to the second transportation pickup location in relation to the second augmented reality element.

5. The computer-implemented method of claim 1, wherein providing the first augmented reality element comprises:
   determining a comparison metric between the first transportation pickup location and the second transportation pickup location; and
   providing, for display via the requestor computing device, the comparison metric in relation to the first augmented reality element.

6. The computer-implemented method of claim 1, further comprising selecting the first transportation pickup location by analyzing environmental digital images from the environmental digital image stream.

7. The computer-implemented method of claim 1, further comprising detecting the user action by detecting a gesture within the environmental digital image stream indicating the first transportation pickup location.

8. The computer-implemented method of claim 1, further comprising detecting the user action by detecting movement of the requestor computing device along a path corresponding to the first transportation pickup location.

9. A system comprising:
   at least one processor; and
   at least one non-transitory computer-readable storage medium storing instructions that, when executed by the at least one processor, cause the system to:
   capture an environmental digital image stream utilizing a camera of a requestor computing device;
   determine, utilizing the environmental digital image stream and a location of the requestor computing device, a first transportation pickup location and a second transportation pickup location for the requestor computing device;
   provide, for display via the requestor computing device, a first augmented reality element, overlayed within the environmental digital image stream, in relation to the first transportation pickup location and a second augmented reality element, overlayed within the environmental digital image stream, in relation to the second transportation pickup location; and
   in response to detecting a user action via the requestor computing device, select the first transportation pickup location for the requestor computing device and a matched provider computing device.

10. The system of claim 9, further comprising instructions that, when executed by the at least one processor, cause the system to determine the first transportation pickup location and the second transportation pickup location for the requestor computing device based on a transportation request transmitted by the requestor computing device.

11. The system of claim 9, further comprising instructions that, when executed by the at least one processor, cause the system to provide the first augmented reality element by providing, for display via the requestor computing device, a first estimated time of arrival or a first transportation value corresponding to the first transportation pickup location in relation to the first augmented reality element.

12. The system of claim 11, further comprising instructions that, when executed by the at least one processor, cause the system to provide the second augmented reality element by providing, for display via the requestor computing device, a second estimated time of arrival or a second transportation value corresponding to the second transportation pickup location in relation to the second augmented reality element.

13. The system of claim 9, further comprising instructions that, when executed by the at least one processor, cause the system to provide the first augmented reality element by:
   determining a comparison metric between the first transportation pickup location and the second transportation pickup location; and
   providing, for display via the requestor computing device, the comparison metric in relation to the first augmented reality element.

14. The system of claim 9, further comprising instructions that, when executed by the at least one processor, cause the system to detect the user action by performing at least one of:
   detecting a gesture within the environmental digital image stream indicating the first transportation pickup location; or
   detecting movement of the requestor computing device along a path corresponding to the first transportation pickup location.

15. A non-transitory computer-readable medium storing instructions that, when executed by at least one processor, cause a computer system to:
   capture an environmental digital image stream utilizing a camera of a requestor computing device;
   determine, utilizing the environmental digital image stream and a location of the requestor computing device, a first transportation pickup location and a second transportation pickup location for the requestor computing device;
   provide, for display via the requestor computing device, a first augmented reality element, overlayed within the environmental digital image stream, in relation to the first transportation pickup location and a second augmented reality element, overlayed within the environmental digital image stream, in relation to the second transportation pickup location; and
   in response to detecting a user action via the requestor computing device, select the first transportation pickup location for the requestor computing device and a matched provider computing device.

16. The non-transitory computer-readable medium of claim 15, further comprising instructions that, when executed by the at least one processor, cause the computer system to determine the first transportation pickup location and the second transportation pickup location for the requestor computing device based on a transportation request transmitted by the requestor computing device.

17. The non-transitory computer-readable medium of claim 15, further comprising instructions that, when executed by the at least one processor, cause the computer system to provide the first augmented reality element by providing, for display via the requestor computing device, a first estimated time of arrival or a first transportation value corresponding to the first transportation pickup location in relation to the first augmented reality element.

18. The non-transitory computer-readable medium of claim 17, further comprising instructions that, when executed by the at least one processor, cause the computer system to provide the second augmented reality element by providing, for display via the requestor computing device, a second estimated time of arrival or a second transportation value corresponding to the second transportation pickup location in relation to the second augmented reality element.

19. The non-transitory computer-readable medium of claim 15, further comprising instructions that, when executed by the at least one processor, cause the computer system to provide the first augmented reality element by:
   determining a comparison metric between the first transportation pickup location and the second transportation pickup location; and
   providing, for display via the requestor computing device, the comparison metric in relation to the first augmented reality element.

20. The non-transitory computer-readable medium of claim 15, further comprising instructions that, when executed by the at least one processor, cause the computer system to detect the user action by performing at least one of:
   detecting a gesture within the environmental digital image stream indicating the first transportation pickup location; or
   detecting movement of the requestor computing device along a path corresponding to the first transportation pickup location.

* * * * *